United States Patent
Jacoby et al.

(10) Patent No.: US 11,966,042 B2
(45) Date of Patent: Apr. 23, 2024

(54) AUGMENTED REALITY DISPLAY UNITS AND AUGMENTED REALITY HEADSETS COMPRISING THE SAME

(71) Applicant: ADLENS LTD., Eynsham (GB)

(72) Inventors: Thomas Norman Llyn Jacoby, Eynsham (GB); Robert Edward Stevens, Eynsham (GB); Simon Peter Horrocks, Eynsham (GB); Alex Edginton, Eynsham (GB)

(73) Assignee: Adlens Ltd., Eynsham (GB)

( * ) Notice: Subject to any disclaimer, the term of this patent is extended or adjusted under 35 U.S.C. 154(b) by 737 days.

(21) Appl. No.: 17/041,994

(22) PCT Filed: Mar. 26, 2019

(86) PCT No.: PCT/GB2019/050849
§ 371 (c)(1),
(2) Date: Sep. 25, 2020

(87) PCT Pub. No.: WO2019/186132
PCT Pub. Date: Oct. 3, 2019

(65) Prior Publication Data
US 2021/0141212 A1 May 13, 2021

(30) Foreign Application Priority Data

Mar. 26, 2018 (GB) ...................................... 1804813
Mar. 22, 2019 (WO) ................ PCT/GB2019/050821

(51) Int. Cl.
*G02B 26/00* (2006.01)
*G02B 3/14* (2006.01)
(Continued)

(52) U.S. Cl.
CPC ............. *G02B 26/004* (2013.01); *G02B 3/14* (2013.01); *G02B 27/0172* (2013.01);
(Continued)

(58) Field of Classification Search
CPC .......... G02B 26/004; G02B 2027/0178; G02B 2027/0127; G02B 3/14; G02C 7/085
(Continued)

(56) References Cited

U.S. PATENT DOCUMENTS 5,526,067 A   6/1996  Cronin et al.
6,318,857 B1  11/2001 Shirayanagi
(Continued)

FOREIGN PATENT DOCUMENTS

TW   200914878 A   4/2009
TW      I464480 B  12/2014

OTHER PUBLICATIONS

Office Action issued for Taiwan Patent Application No. 108110447 dated Feb. 24, 2023, 13 pages.
(Continued)

*Primary Examiner* — Jerry L Brooks
(74) *Attorney, Agent, or Firm* — Sharon E. Crane

(57) ABSTRACT

An augmented reality display unit for use in an augmented reality headset or the like comprising front and rear variable focusing power compression liquid lens assemblies (220, 230) in mutual optical alignment on an optical axis (O), a transparent waveguide display (240) interposed between the front and rear liquid lens assemblies (220, 230) and a selectively operable adjustment mechanism for adjusting the focusing powers of the front and rear compression liquid lens assemblies (220, 230); wherein each of the front and rear compression liquid lens assemblies (220, 230) comprises a fluid-filled envelope (225, 235) having a first wall formed by a distensible elastic membrane (226, 236) that is held under tension around its edge by a peripheral support ring, a second substantially rigid wall (223, 233) formed by or supported on an inner surface of a transparent plate or a hard lens of fixed focusing power, and a collapsible side wall (Continued)

(227, 237), the membrane forming an optical surface of variable optical power, and the adjustment mechanism being arranged to displace the support ring towards or away from the second wall parallel to the optical axis (O) for increasing or decreasing the pressure of the fluid (228, 238) within the envelope thereby to cause the membrane to distend or contract respectively parallel to the optical axis for changing the focusing power of the optical surface of the membrane (226, 236); wherein the second wall (223) of the front compression liquid lens (220) is formed by or supported on a transparent plate or hard lens (222) which is tilted at a first angle to the optical axis to introduce a first amount of prism to a ray of light passing therethrough, and the second wall (233) of the rear compression liquid lens is formed by or supported on a transparent plate or hard lens (232) which is tilted at a second angle to the optical axis to introduce a second amount of prism to a ray of light passing therethrough, wherein the first and second amounts of prism are mutually substantially equal and opposite.

28 Claims, 20 Drawing Sheets

(51) Int. Cl.
*G02B 27/01* (2006.01)
*G02C 7/08* (2006.01)

(52) U.S. Cl.
CPC ............ *G02B 2027/0127* (2013.01); *G02B 2027/0178* (2013.01); *G02C 7/085* (2013.01)

(58) Field of Classification Search
USPC ......................................................... 353/630
See application file for complete search history.

(56) References Cited

U.S. PATENT DOCUMENTS

| | | |
|---|---|---|
| 7,986,465 B1 | 7/2011 | Lo et al. |
| 2011/0007161 A1 | 1/2011 | Batchko et al. |
| 2013/0300635 A1 | 11/2013 | White et al. |
| 2017/0168307 A1 | 6/2017 | Itani |

OTHER PUBLICATIONS

Kramida, G., "Resolving the vergence-accommodation conflict in head-mounted displays," IEEE Transactions on Visualization and Computer Graphics, vol. 22, No. 7, Jul. 2016, pp. 1912-1931.
International Search Report and Written Opinion for PCT/GB2019/050849 dated Oct. 1, 2019, 23 pages.

B:B State b

AUGMENTED REALITY DISPLAY UNITS AND AUGMENTED REALITY HEADSETS COMPRISING THE SAME

CROSS REFERENCE TO RELATED APPLICATION

This application is a 35 U.S.C. 371 National Phase Entry Application from PCT/GB2019/050849, filed Mar. 26, 2019, which claims priority to United Kingdom Patent Application No. 1804813.2, filed Mar. 26, 2018, and PCT/GB2019/050821, filed Mar. 22, 2019, the disclosures of which are incorporated herein in their entirety by reference, and priority is claimed to each of the foregoing.

FIELD OF THE INVENTION

The present invention relates to augmented reality display units of the kind comprising front and rear variable focusing power lenses with an interposed transparent waveguide display. The invention has particular reference to augmented reality display units that comprise two variable focusing power compressible liquid lenses. The present invention also comprehends an augmented reality headset comprising at least one augmented reality display module in accordance with the invention.

BACKGROUND TO THE INVENTION

WO 99/061940 A1 discloses a compression-type variable focusing power liquid lens in which a closed chamber having opposed walls formed by a transparent wall member and a distensible membrane is filled with a transparent liquid and means are provided for changing the spacing between the transparent wall member and the distensible membrane for varying the pressure of the transparent liquid in the chamber. A fixed-focus rigid lens is arranged exteriorly of the chamber, abutting the transparent wall member.

WO2015/081313 A2 discloses configurations for presenting virtual reality and augmented reality experiences to users. The system may comprise an image-generating source to provide one or more frames of image data in a time-sequential manner, a light modulator configured to transmit light associated with the one or more frames of image data, a substrate to direct image information to a user's eye, wherein the substrate houses a plurality of reflectors, a first reflector of the plurality of reflectors to reflect transmitted light associated with a first frame of image data at a first angle to the user's eye, and a second reflector to reflect transmitted light associated with a second frame of the image data at a second angle to the user's eye.

Meanwhile WO2017/112958 A1 discloses a retinal light scanning engine (RLSE) to write light corresponding to an image on the retina of a user. A light source of the retinal light scanning engine forms a single point of light on the retina at any single, discrete moment in time. To form a complete image, the RLSE uses a pattern to scan or write on the retina to provide light to millions of such points over one time segment corresponding to the image. The RLSE changes the intensity and colour of the points drawn by the pattern by simultaneously controlling the power of different light sources and movement of an optical scanner to display the desired content on the retina according to the pattern. In addition, the pattern may be optimized for writing an image on the retina. Moreover, multiple patterns may be used to increase or improve the field-of-view of the display.

US 2013/0300635 A1 discloses a method, apparatus and computer program product for facilitating performing focus correction of displayed information. In the context of a method, a focus distance of the user is determined. The method may also determine determining at least one focal point setting for one or more dynamic focus optical components of the display based on the focus distance. The method may also cause a configuring of the one or more dynamic focus optical components based on the at least one focal point setting to present a representation of data on the display. The dynamic focus optical components can use technologies such as fluidics, electrooptics, or any other dynamic focusing technology. For example, fluidics-based dynamic focus components may include focusing elements whose focal point settings or focus can be changed by fluidic injection or deflation of the focusing elements.

An application for adjustable lenses is in the field of head-up displays (HUD) and helmet-mounted displays, as disclosed for example in EP 3091740 A1 in which a binocular display device comprises two ocular assemblies to be worn by a user concurrently with one respective ocular assembly at each eye, each ocular assembly comprising an outer optical part having a positive optical strength arranged for receiving external light from an external scene and for directing the result to a transparent waveguide display part of the device that is arranged for outputting substantially collimated display light and an inner optical part having a negative optical strength arranged for receiving both the external light and the substantially collimated display light from the waveguide display part and for imposing a divergence on the received display light to generate a virtual focal point substantially common to each ocular assembly and outputting the result for display whereby, in use, an image conveyed by the display light is superimposed on the external scene as a three-dimensional image when viewed through the binocular display device. The device comprises a controller unit arranged to control the optical strength of the two divergent lenses such that the virtual focal point remains substantially common to each ocular assembly, and such that it may vary in position US 2017/0293145 A1 discloses an augmented reality display system including a pair of variable focus lens elements that sandwich a waveguide stack. One of the lens elements is positioned between the waveguide stack and the user's eye to correct for refractive errors in the focusing light projected from the waveguide stack to that eye. The lens elements may also be configured to provide appropriate optical power to place displayed virtual content on a desired depth plane. The other lens element is between the ambient environment and the waveguide stack, and is configured to provide optical power to compensate for aberrations in the transmission of ambient light through the waveguide stack in the lens element closest to the eye. In addition, an eye-tracking system monitors the vergence of the user's eyes and automatically and continuously adjusts the optical powers of the pair of lens elements based on the determined versions of those eyes. In some embodiments, the variable focus lens elements may be adaptable optical elements. In some embodiments, the adaptable optical elements may comprise a transmissive optical element such as a dynamic lens (e.g., a liquid crystal lens, an electroactive lens, a conventional refractive lens with moving elements, a mechanical-deformation-based lens, an electrowetting lens, an elastomeric lens, or a plurality of fluids with different refractive indices).

Important considerations for an augmented reality display unit comprising two or more variable focusing power lenses and an interposed waveguide display include the size and weight of the unit and its power consumption for operating the variable focusing power lenses.

An object of the present invention is to reduce the power requirement for an augmented reality display unit comprising two or more compression-type variable focusing power liquid lenses and an interposed waveguide display.

Another object of the present invention is to reduce the size and/or weight of an augmented reality display unit comprising two or more compression-type variable focusing power liquid lenses and an interposed waveguide display.

SUMMARY OF THE INVENTION

In accordance with a first aspect of the present invention, therefore, there is provided an augmented reality display unit for use in an augmented reality headset or the like comprising front and rear variable focusing power compression liquid lens assemblies in mutual optical alignment on an optical axis, a transparent waveguide display interposed between the front and rear liquid lens assemblies and a selectively operable adjustment mechanism for simultaneously adjusting the focusing powers of the front and rear compression liquid lens assemblies in a mutually inverse manner. Each of the front and rear compression liquid lens assemblies is configured to store elastic potential energy as its absolute focusing power is increased and releases elastic potential energy as its absolute focusing power is decreased. Advantageously, the adjustment mechanism is configured to link actuation of the front and rear compression liquid lens assemblies such that elastic potential energy released by one of the compression liquid lens assemblies as its absolute focusing power is decreased assists in driving the adjustment mechanism to increase the absolute focusing power of the other compression liquid lens assembly.

In the absence of friction, therefore, a single adjustment mechanism for actuating the front and rear lens assemblies may require less work than an equivalent single adjustment mechanism for positive actuation of one of the lens assemblies individually. To a first order, and in the absence of friction, quasi-static actuation of a pair of liquid lens assemblies that are linked in accordance with the invention will require approximately half the work that is required to actuate an individual liquid lens assembly.

By 'optical axis' of the augmented reality display unit herein is meant a line through the augmented reality display unit that introduces no net deviation in the direction of a light ray, i.e. no net prism. Generally, the augmented reality display unit will be configured such that in use a user will look straight ahead through the augmented reality display unit along the optical axis. Each of the front and rear variable focusing power compression liquid lens assemblies defines its own lens optical axis, which in each case is a line through the lens assembly that introduces no net deviation in the direction of a light ray. As described in more detail below, in some embodiments, the optical axis of the augmented reality display unit may be different from the lens optical axes of the front and rear lens assemblies. As in a typical pair of corrective glasses or other eyewear having lenses, the optical axis of the augmented reality display unit may typically be positioned off-centre, closer to a first nasal region of the display unit that in use is positioned juxtaposed the user's nose than to a second temple region of the display unit which, in use, is positioned juxtaposed the user's temple.

Suitably, each of the front and rear compression liquid lens assemblies may comprise a fluid-filled envelope having a first wall formed by a distensible elastic membrane that is held under tension around its edge by a membrane holding structure, a second substantially rigid wall formed by or supported on an inner surface of a transparent plate or a hard lens of fixed focusing power, and a collapsible side wall. The membrane may form an optical surface of variable optical power. The adjustment mechanism may be arranged to displace the edge of the membrane towards or away from the second wall in a direction parallel to the optical axis for changing the pressure of the fluid within the envelope, thereby to cause the membrane to distend or contract in a direction parallel to the optical axis for changing the focusing power of the optical surface of the membrane. Each of the front and rear compression liquid lens assemblies defines an optical centre at the point of maximum distension of the membrane, the optical centre being located on the optical axis of the lens assembly, which, as stated above, may be the same or different from the optical axis of the augmented reality display unit as a whole.

Suitably, the membrane holding structure may comprise a peripheral support ring.

In some embodiments, the support ring may be circular. Suitably, the support ring may be rigid.

Alternatively, the support ring may be non-round.

In some embodiments, especially when the support ring is non-round, the support ring may be resiliently bendable.

Suitably, the adjustment mechanism may be arranged to displace one or more regions of the edge of the membrane (e.g. where it is held by the support ring) towards or away from the second wall in a direction parallel to the optical axis. Where the membrane holding structure comprises a bendable support ring, this may cause bending of the support ring. In particular, the support ring may bend in a direction substantially parallel to the optical axis. More particularly, the support ring may be bend in a plane that is substantially parallel to the optical axis and substantially parallel to a tangent to the support ring at the point of bending.

In some embodiments, the edge of the membrane may be held (e.g. by the support ring) at a fixed distance from the second wall at one or more hinge points. The edge of the membrane may be flexible between the hinge points. For example, the support ring may be bendable between the hinge points.

In some embodiments, the actuation mechanism engages the membrane holding structure (e.g. the support ring) at one or more actuation points, such that operation of the actuation mechanism causes local displacement of the membrane holding structure towards or away from the second wall substantially parallel to the optical axis at the one or more actuation points.

Suitably, the adjustment mechanism may comprise a reciprocally moveable part that is operably connected to the membrane holding structure (e.g. support rings) of the front and rear compression liquid lens assemblies for simultaneously displacing the membrane holding structure towards or away from their respective second walls in a direction substantially parallel to the optical axis and in a mutually inverse manner, such that when the absolute focusing power of one of the compression liquid lens assemblies is increased, the absolute focusing power of the other compression liquid lens assembly is decreased and vice versa.

For instance, in some embodiments, the adjustment mechanism may comprise a reciprocally moveable cam plate having one or more first cam surfaces that are arranged to engage one or more respective cam follower members at one or more of the actuation points on the membrane holding structure (e.g. the support ring) of the front compression liquid lens assembly and one or more second cam surfaces that are arranged to engage one or more respective cam follower members at one or more of the actuation points on the membrane holding structure (e.g. the support ring) of the rear compression liquid lens assembly. The one or more first cam surfaces and one or more second cam surfaces may be configured such that movement of the cam plate causes simultaneous displacement of the membrane holding structures of the front and rear compression liquid lens assemblies at their respective actuation points towards or away from their respective second walls in a direction substantially parallel to the optical axis in a mutually inverse manner. In this way, as the absolute focusing power of one of the compression liquid lens assemblies is increased, the absolute focusing power of the other compression liquid lens assembly may be decreased and vice versa.

Suitably, the reciprocally moveable part may comprise a collar having first and second opposite ends that is arranged wholly or partly around the waveguide display. The collar may be arranged for reciprocal movement in a direction substantially parallel to the optical axis between the front and rear liquid compression lens assemblies. The first end of the collar or a part connected thereto may be arranged to engage the membrane holding structure (e.g. support ring) of the front compression liquid lens assembly. Meanwhile, the second end of the collar or a part connected thereto may be arranged to engage the membrane holding structure (e.g. support ring) of the rear compression liquid lens assembly.

In some embodiments, the front and rear compression liquid lens assemblies may be arranged with their respective membranes and membrane holding structures (e.g. the support rings) facing towards the collar.

Suitably, the collar may be formed with at least one aperture which remains aligned with the waveguide display at all positions of the collar between the front and rear compression liquid lens assemblies.

In some embodiments, the second wall of the front compression liquid lens may be formed by or supported on a hard lens or plate having an optical outer surface having a focusing power in the range of about −1.0 to about 0 dioptres, suitably 0 or −0.5 dioptres. The optical surface of the membrane of the front compression liquid lens may have a baseline focusing power of about 0 to 1.0 dioptres, suitably 0 or 0.5 dioptres, and may be adjustable by an amount in the range of about 1.0 to 3.0 dioptres, suitably 2.0 or 2.5 dioptres. In some embodiments, the hard lens or plate of the front compression liquid lens may be formed on a base curve, and the baseline focusing power of the membrane of the front compression liquid lens should be adjusted accordingly.

Similarly, the second wall of the rear compression liquid lens may be formed by or supported on a hard lens having an optical outer surface having a focusing power in the range of about −1.0 to about −3.0 dioptres, suitably −2.0 or −2.5 dioptres. Suitably, the optical surface of the membrane of the rear compression liquid lens may have a baseline focusing power of about 0 to 1.0 dioptres, suitably 0 or 0.5 dioptres, and is adjustable by an amount in the range of about 1.0 to 3.0 dioptres, suitably 2.0 or 2.5 dioptres. In some embodiments, the optical outer surface of the hard lens of the rear compression liquid lens may have a negative focusing power having an absolute value that is greater than the absolute value of the positive focusing power of the membrane of the rear liquid lens, such that the augmented reality display unit always has a constant net negative focusing power to correct for a user's refractive error. Thus, in some embodiments, the optical outer surface of the hard lens of the rear compression lens may have a focusing power up to about −9.0 dioptres; more typically up to about −6.0 dioptres.

Accordingly, in some embodiments, the net focusing power of the augmented display unit may remain substantially zero during adjustment of the rear compression liquid lens. Whilst, in some embodiments, the net focusing power of the augmented display unit may remain non-zero and substantially constant during adjustment of the rear compression liquid lens.

In some embodiments, the second wall of the front compression liquid lens may be formed by or supported on a transparent plate or hard lens that is tilted at a first angle relative to the optical axis of the augmented reality display unit. Such tilting of the transparent plate or hard lens may introduce a first amount of prism to a ray of light passing therethrough. The second wall of the rear compression liquid lens may similarly be formed by or supported on a transparent plate or hard lens that is tilted at a second angle to the optical axis, thereby to introduce a second amount of prism to a ray of light passing therethrough. The first and second amounts of prism may be mutually substantially equal and opposite.

In a second aspect of the present invention therefore, there is provided an augmented reality display unit for use in an augmented reality headset or the like comprising front and rear variable focusing power compression liquid lens assemblies in mutual optical alignment on an optical axis, a transparent waveguide display interposed between the front and rear liquid lens assemblies and a selectively operable adjustment mechanism for adjusting the focusing powers of the front and rear compression liquid lens assemblies. Each of the front and rear compression liquid lens assemblies may comprise a fluid-filled envelope having a first wall formed by a distensible elastic membrane that is held under tension around its edge by a peripheral membrane holding structure, a second substantially rigid wall formed by or supported on a surface of a transparent plate or a hard lens of fixed focusing power, and a collapsible side wall. In each of the front and rear compression liquid lens assemblies, the membrane may form an optical surface of variable optical power. The adjustment mechanism may be arranged to displace the membrane holding structure towards or away from the second wall parallel to the optical axis for changing the pressure of the fluid within the envelope, thereby to cause the membrane to distend or contract in a direction parallel to the optical axis for adjusting the focusing power of the optical surface of the membrane. The second wall of the front compression liquid lens may be formed by or supported on a transparent plate or hard lens that is tilted at a first angle to the optical axis to introduce a first amount of prism to a ray of light passing therethrough. The second wall of the rear compression liquid lens may be formed by or supported on a transparent plate or hard lens that is tilted at a second angle to the optical axis to introduce a second amount of prism to a ray of light passing therethrough. The first and second amounts of prism are suitably mutually substantially equal and opposite.

As described above, the optical axis of the augmented reality display unit is the axis on which a user looks straight ahead through the augmented reality display unit. Suitably, the optical axis of the augmented reality display unit may be disposed in an off-centre location on each of the membranes, i.e. closer to one region of the edge of the membrane than to other regions of the edge of the membrane. For instance, for field of view considerations, the optical axis may typically be disposed closer to a nasal region of the edge of the membrane which is arranged to be located in use juxtaposed the user's nose than to a temple region of the edge of the membrane, which is arranged to be located in use juxtaposed the user's temple.

Further, each of the front and rear compression liquid lens assemblies has optical centre at the point of maximum distension of the membrane, the optical centre being located on a lens optical axis of the lens assembly. As mentioned above, the lens optical axis is a line through the lens assembly that introduces no net deviation in the direction of a light ray and, as stated above, may be the same or different from the optical axis of the augmented reality display unit as a whole.

In some embodiments, the front compression liquid lens assembly may be configured such that its membrane in its least distended form has a curvature away from its second wall that is greater than the curvature of the second wall. Meanwhile, the rear compression liquid lens assembly may be configured such that its membrane, in its least distended form, has a curvature away from its respective second wall that is less than the curvature of the second wall. Advantageously, the transparent plate or hard lens of the front compression liquid lens assembly may be tilted towards a first edge region of its associated membrane. Where the optical axis of the augmented reality display unit is located closer to the first edge region of the membrane than it is to other regions of the edge of the membrane, this may have the effect of displacing the optical centre of the front lens assembly towards the centre of the membrane away from optical axis of the display unit, thereby introducing the first amount of prism. Meanwhile, the hard lens of the rear compression liquid lens assembly may be tilted away from a second edge region of its associated membrane. This may have the effect of displacing the optical centre of the rear lens assembly towards the centre of the membrane away from optical axis of the display unit, thereby introducing the second amount of prism. The first and second edge regions of the of the membranes of the front and rear compression liquid lens assemblies may be mutually aligned. The first and second degrees of prism are suitably equal and opposite such that there is no (or minimal) net change in the direction of a ray of light travelling on the optical axis.

This arrangement advantageously allows the hard lens or plate of the front liquid lens assembly to be moved closer to its associated membrane, at least juxtaposed the first edge region, to reduce the thickness of the front liquid lens assembly. Similarly, the arrangement may allow the hard lens of the rear liquid lens assembly to be move closer to its associated membrane, thereby reducing the thickness of the rear liquid lens assembly. In both the front and rear lens assemblies, tilting the hard lens or plate allows the optical centre of the lens assembly to be moved to, or closer to, the geometric centre of the membrane. In some embodiments, the front and rear lens assemblies are shaped such that each of the membranes defines two mutually orthogonal axes that are oriented substantially orthogonally to the optical axis; namely a first long axis and a second short axis, where the long axis is longer than the short axis. Typically the lens assemblies may be configured such that the long axis extends substantially horizontally in use, while the short axis extends substantially vertically, although it will be appreciated this is dependent on an eye-shape defined by the lens assemblies.

Thus, where the front compression liquid lens assembly is configured as described above such that its membrane in its least distended form has a curvature away from its second wall that is greater than the curvature of the second wall, this arrangement allows the membrane to be compressed by substantially the same amount in a direction parallel to the optical axis in regions of the edge of the membrane at opposite ends of the long axis, which in turn allows the front lens assembly to be made as thin as possible on the optical axis, since a minimum clearance condition of the front lens assembly obtains at the ends of such a long axis.

Further, where the rear compression liquid lens assembly is configured as described above such that its membrane in its least distended form has a curvature away from its second wall that is greater than the curvature of the second wall, this arrangement allows the membrane to be extended by substantially the same amount on the optical axis in regions of the edge of the membrane at opposite ends of the long axis, which in turn allows the rear lens assembly to be made as thin as possible on the optical axis. Since a minimum clearance condition of the front lens assembly obtains at the centre of the long axis between the two opposite ends. It will be understood that this consideration and that of the preceding paragraph relates to spherical membrane shapes, but similar considerations apply to elliptical (spherocylindrical) surfaces.

Whilst the first and second amounts of prism are suitably mutually substantially equal and opposite, such that the net prism introduced to a ray of light passing through both front and rear lens assemblies is zero or nearly zero, it will be understood that light emitted by the waveguide display part is only through the rear lens assembly. Suitably, therefore, the waveguide display may be configured to output light with an amount of prism that is equal to the first amount of prism.

As with the augmented reality display unit of the first aspect of the present invention, the membrane holding structures of the augmented reality display unit according to this second aspect may also comprise a membrane support ring, e.g. a bendable support ring. More generally, features of the augmented reality display unit that are described in relation to one or other of the first or second aspects of the invention are applicable to both aspects and should be understood as such except where indicated to the contrary.

In another aspect of the present invention there is provided an augmented reality headset for a user, which comprises at least one augmented reality display unit in accordance with the first and/or second aspect of the present invention and at least one projector. The augmented reality display unit may be arranged on or in the headset such that it is positioned in front of a user's eye when the headset is worn. The projector has an output that may be coupled to the waveguide display.

Suitably, the augmented reality headset may comprise two augmented reality display units in accordance with the first and/or second aspect of the present invention. Suitably, each of the augmented reality display units may be positioned in or on the headset such that it is positioned in front of a respective one of the user's eyes when the headset is worn.

DETAILED DESCRIPTION OF THE INVENTION

Following is a description by way of example only with reference to the accompanying drawings of embodiments of the various aspects of the present invention.

BRIEF DESCRIPTION OF THE DRAWINGS

In the drawings:

In FIG. 9A, the hard lens of the rear compressible liquid lens assembly is shown in an un-tilted position; in FIG. 9B, the hard lens of the rear compressible liquid lens assembly is tilted with respect to the optical axis; in FIG. 9C, the hard lens of the rear compressible liquid lens assembly is tilted with respect to the optical axis and is moved closer to the distensible membrane.

FIG. 14A shows front and rear compressible liquid lens assemblies that form part of the augmented reality display unit and an interposed waveguide display.

BACKGROUND DESCRIPTION OF AN AUGMENTED REALITY DISPLAY UNIT

Figure 1A:
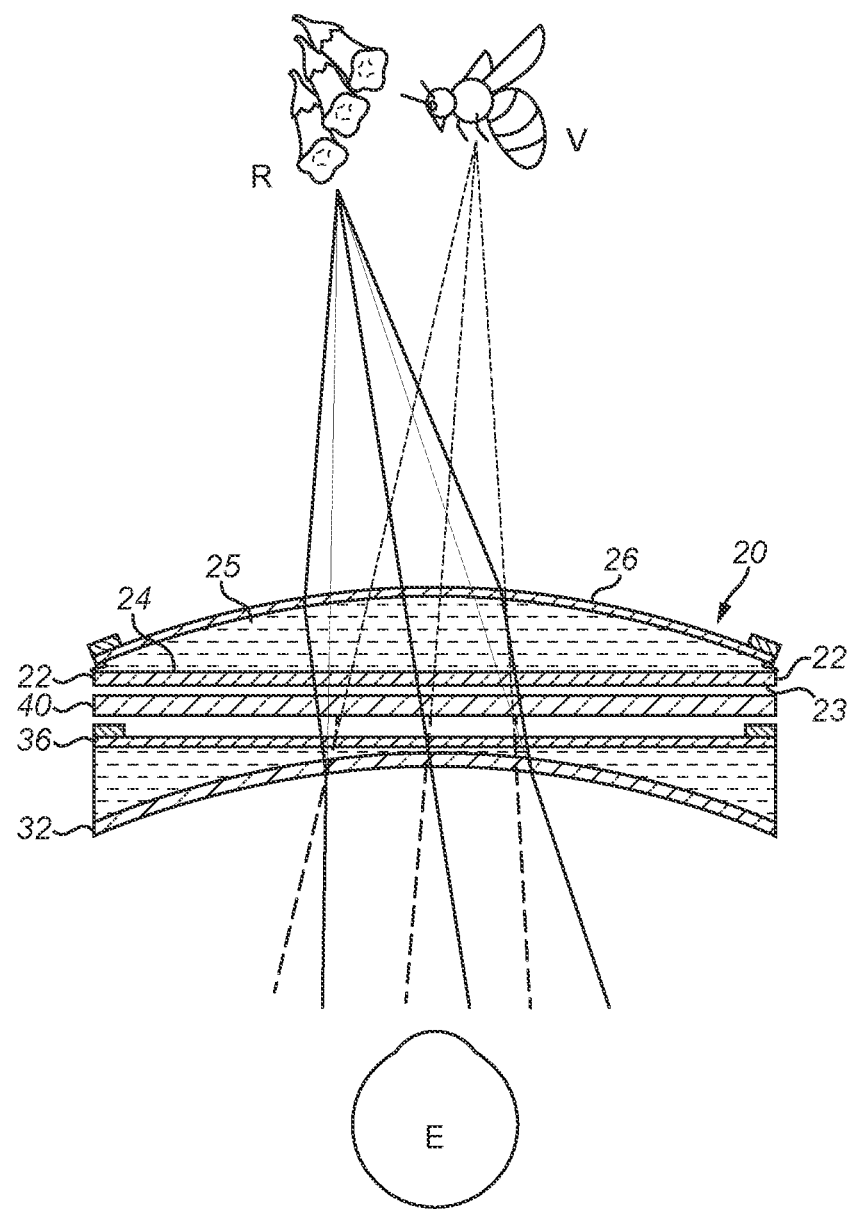
FIGS. 1A-1D are a series of schematic representations of an augmented reality display unit comprising front and rear variable focusing power compressible liquid lens assemblies and an interposed waveguide display. The augmented reality display unit is shown in cross-section to illustrate adjustment of the front and rear compressible liquid lens assemblies has a conjugate pair such that their net focusing power is zero. In each of FIGS. 1A-1D, a virtual object (a bee) is shown in different virtual image planes according to the focusing power of the rear compressible liquid lens assembly, while a real object (a foxglove) is shown in its real image plane.

FIGS. 1A-1D comprise a series of schematic representations of an augmented reality display unit 10 which comprises a front variable focusing power compressible liquid lens assembly 20, a rear variable focusing power compressible liquid lens assembly 30 and a transparent waveguide display 40 that is arranged intermediate the front and rear compressible liquid lens assemblies 20, 30.

The front compressible liquid lens assembly 20 comprises a plano-convex hard rear lens 22 having a planar rear optical surface 23 and a convex front surface 24. The front surface 24 of the rear lens 22 forms a rear wall of a fluid-filled envelope 25 which has a front wall that is formed by an optically clear distensible membrane 26 that is held around its edge under tension by a peripheral support ring 21 which serves as a membrane holding structure. The envelope further comprises a collapsible sidewall 27 (best shown in FIGS. 1C and 1D) that extends between the peripheral support ring and the front surface 24 of the rear lens 22 and is filled with an optically clear refractive fluid which has a refractive index that is the same or close to the refractive index of the rear lens 22.

The front compressible liquid lens assembly 20 thus forms an integral, variable focusing power lens having a front optical surface that is provided by the distensible membrane 26 and a rear optical surface that is provided by the rear surface 23 of the rear lens 22. The focusing power of the front compressible liquid lens assembly 20 is determined by the focusing power of the rear surface 23 of the rear lens 22 which, in this example is zero since its rear surface 23 is flat, and the focusing power of the membrane 26, which is variable. In the present example, the focusing power of the membrane 26 is variable between 0 and +2.5 dioptres, such that the front compressible liquid lens assembly also has a variable focusing power in the range 0 to +2.5 dioptres, but this range is given solely for the purposes of illustration and may be wider or narrower in other examples.

A suitable adjustment mechanism (not shown) is provided for displacing the peripheral support ring that holds the membrane 26 around its edge towards the front surface 24 of the rear lens 22. The collapsible side wall 27 allows movement of the support ring towards the rear lens 22 to increase the pressure of the refractive fluid within the envelope 25, thereby causing the membrane 26 to distend forwardly, increasing the focusing power of the membrane 26. The membrane 26 is shown in its maximally distended state in FIG. 1A.

Figure 1B:
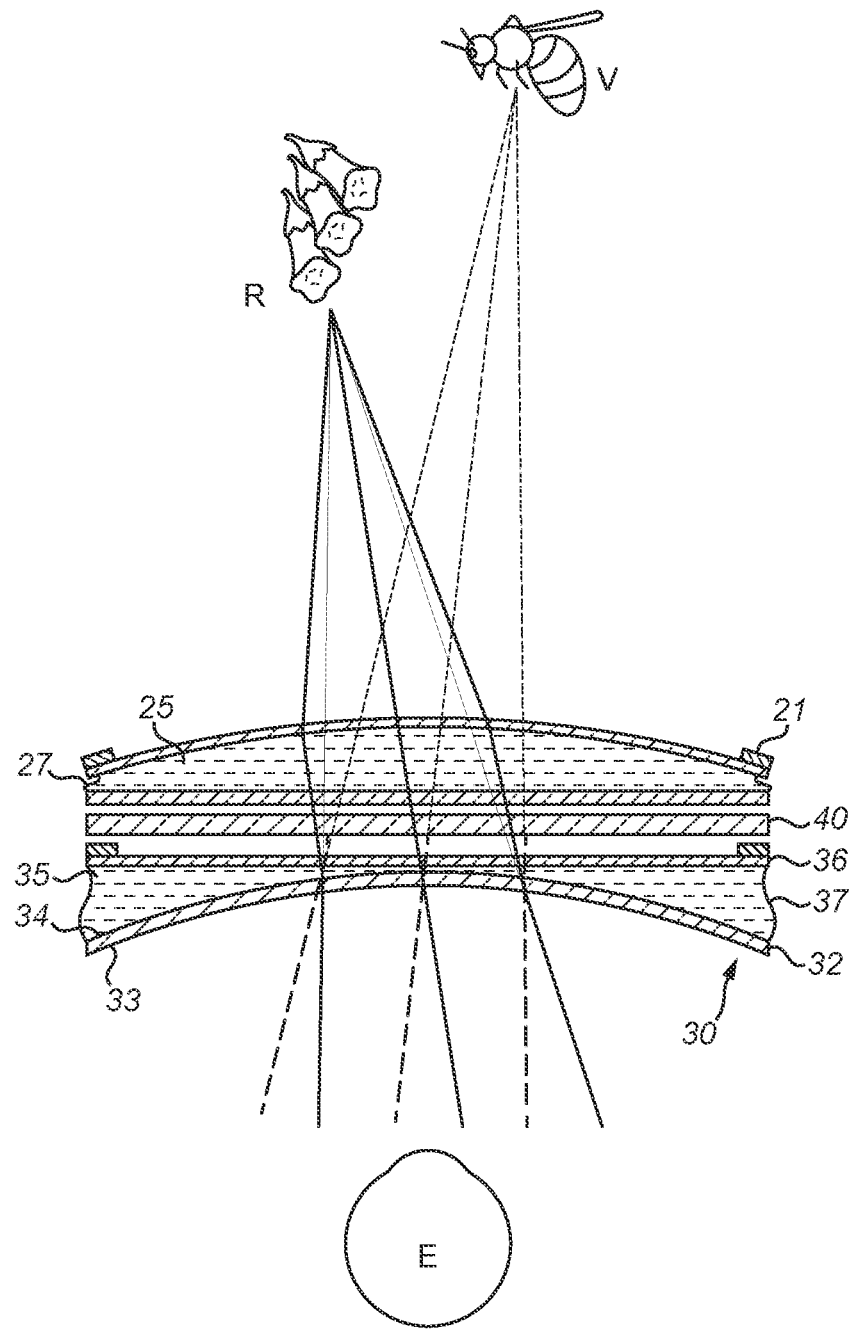
Figure 1C:
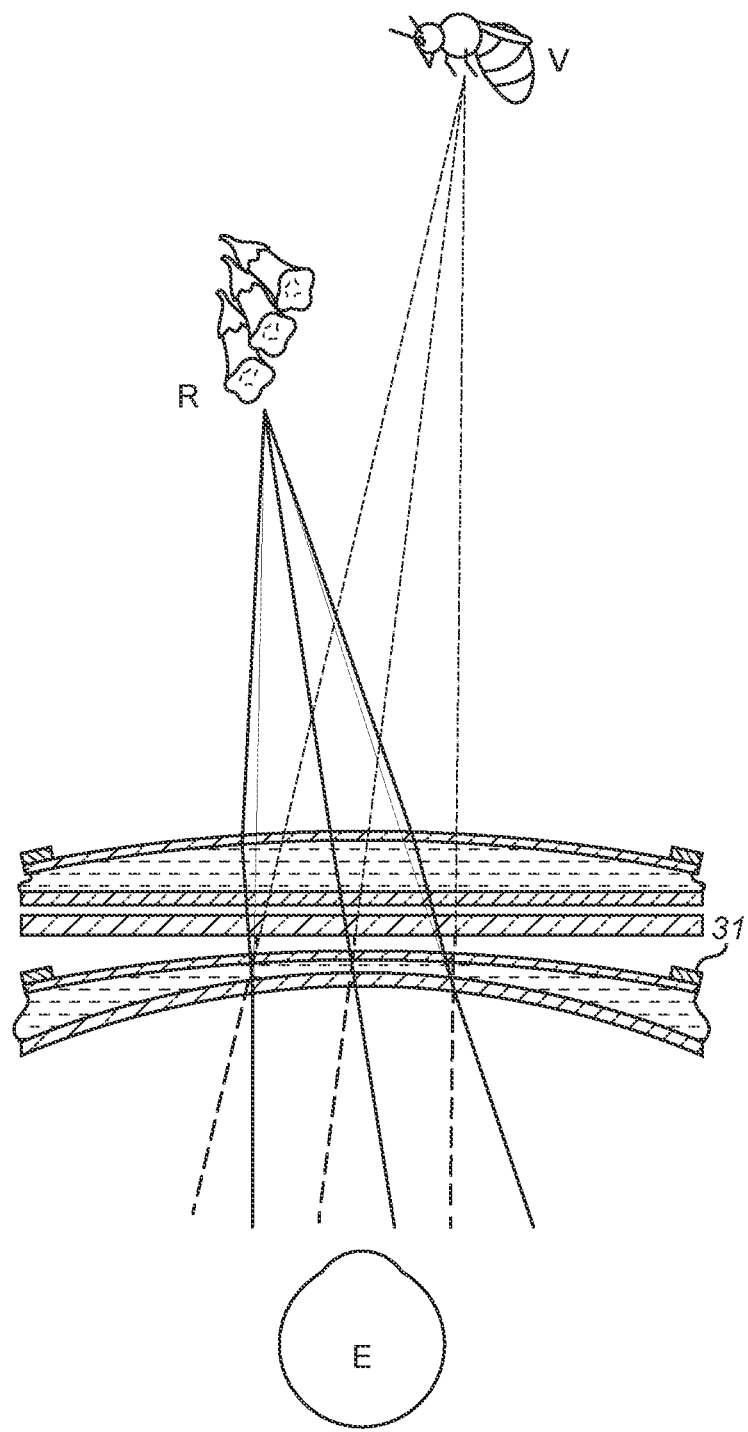
Figure 1D:
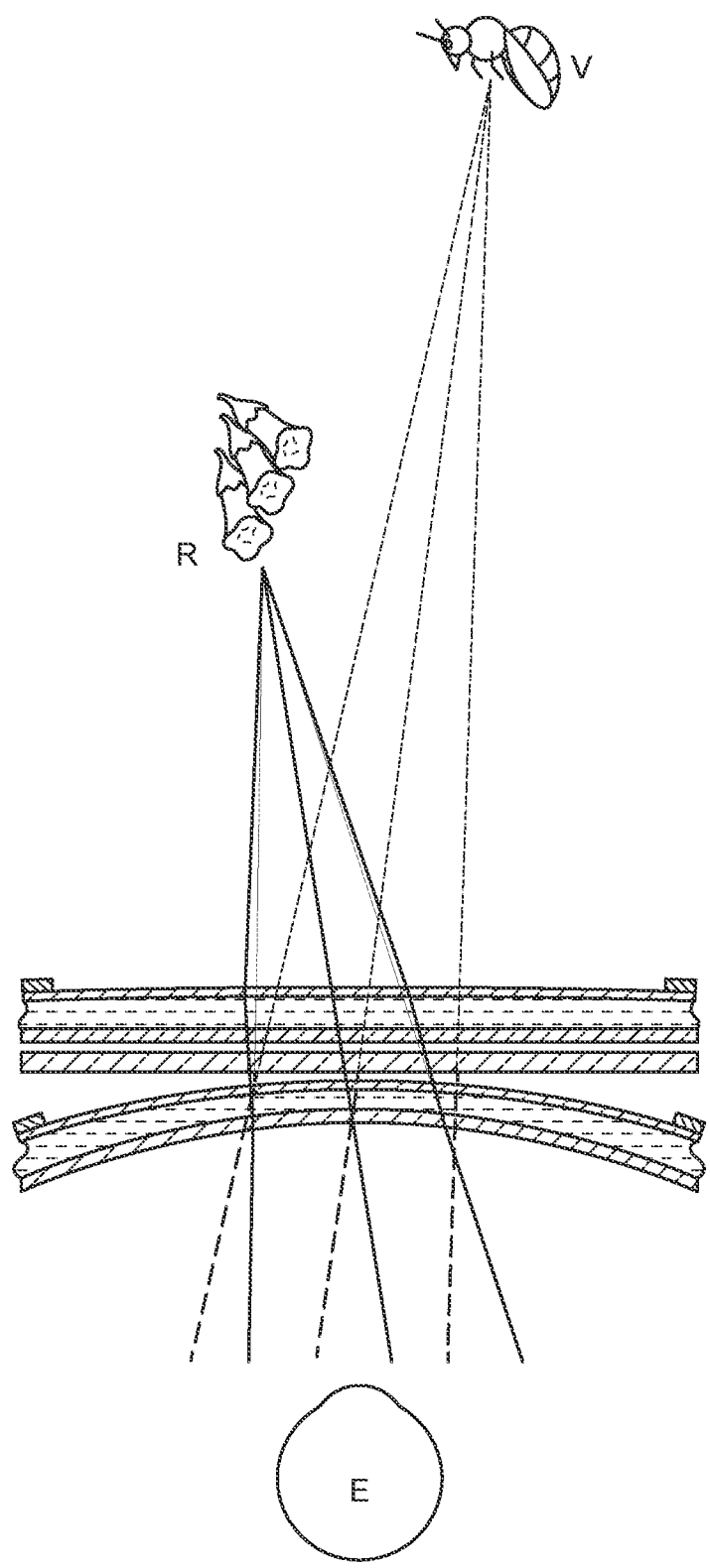

With the membrane 26 in its maximally distended state and the fluid pressure in the envelope 25 increased, the front compressible liquid lens assembly 20 exist in a state of relatively high potential energy. Operating the adjustment mechanism to cause or allow the support ring to move forwards away from the front surface 24 of the rear lens 22 reduces the pressure of the fluid within the envelope 25 and allows the membrane 26 to relax and become less distended as shown in FIGS. 1B-1D in which the focusing power of the membrane 26 is progressively reduced. As the membrane 26 becomes less distended and the fluid pressure within the envelope 25 decreases, the front compressible liquid lens assembly 20 releases potential energy. In FIG. 1D, the membrane 26 is shown in a less distended state in which it is nearly flat, such that the front compressible liquid lens assembly 20 has a small positive focusing power of, e.g. about +0.5 dioptres. In its minimally distended state, the front compressible liquid lens assembly 20 is in a relatively low potential energy state.

The construction of the rear compressible liquid lens assembly 30 is like that of the front compressible liquid lens assembly 20, in that the rear lens assembly 30 comprises a hard rear lens 32, a pre-tensioned optically clear distensible membrane 36 and a collapsible sidewall 37. The membrane 36 and collapsible side wall 37 form a fluid-filled envelope 35 with a convex front surface 34 of the rear lens 32. Like the front lens assembly 20, the envelope 35 of the rear lens assembly 30 is filled with a refractive fluid having a refractive index that is the same or substantially the same as the refractive index of the rear lens 32.

As shown in FIGS. 1A-1D, the transparent waveguide display 40 is coupled to a projector, as described in more detail below.

Unlike the rear lens 22 of the front lens assembly 20, the rear lens 32 of the rear lens assembly 30 has a concave rear surface 33 having a negative focusing power. In the present example, the rear surface 33 has a focusing power of −2.5 dioptres. Like the front lens assembly 20, the membrane 36 of the rear lens assembly is held around its edge by a peripheral support ring 31, which can be displaced towards and away from the rear lens 32 by the adjustment mechanism to change the focusing power of the membrane 36. In its minimally distended state, as shown in FIG. 1A, the membrane 36 of the rear lens assembly 30 has zero focusing power since it is substantially flat, while in its maximally distended state the membrane 36 has an optical power of about +2.5 dioptres. Like the front lens assembly 20, therefore, the rear lens assembly 30 also forms an integral variable focusing power lens having a net focusing power that is determined by the variable focusing power of the membrane 36 and the fixed focusing power of the rear surface 33 of the rear lens 32. The focusing power of the rear lens assembly 30 is therefore adjustable in the range −2.5 to zero dioptres, but again in other examples this range may be wider or narrower depending on the configuration of the rear lens assembly 30, and similarly the focusing power of the rear surface 33 of the rear lens 32 may be varied.

However, as will be apparent from the following, the rear lens assembly 30 should be capable of being adjusted over a range of negative dioptres, including zero, while the front lens assembly 20 should be capable of being adjusted over a conjugate range of positive dioptres, including zero.

As mentioned above, the transparent waveguide display 40 is coupled to a projector (not shown) for receiving light that conveys an image to be displayed to a user. The light is transmitted along the waveguide and is emitted in a manner known to those skilled in the art of virtual and augmented reality display devices as collimated light that is directed towards the user's eye, which is indicated by the letter E in FIGS. 1A-1D. Since the light emitted by the waveguide display 40 is collimated, an image conveyed by the light will be perceived by the user to be at infinity. To create a virtual image at an image plane closer than infinity, the focusing power of the rear lens assembly 30 may be adjusted to a negative dioptre. The greater the (negative) power of the rear lens assembly 30, the closer the virtual image will appear to the user. FIGS. 1A-1D show a virtual image of a bee (indicated by the letter V) in image planes of progressively greater distance from the user as the focusing power of the rear lens assembly 30 is increased from about −2.5 dioptres to about −0.5 dioptres, by progressively increasing the curvature of the membrane 36.

So that the user's vision of a real object in his or her field of view such, for example, as the foxglove indicated by the letter R in FIGS. 1A-1D is unaffected by the focusing power of the rear lens assembly 30, the focusing power of the front lens assembly 20 is adjusted in an inverse manner. As the focusing power of the rear lens assembly 30 is made more negative, the focusing power of the front lens assembly 30 is made more positive to an equal or substantially equal and opposite degree. Thus, in FIG. 1A, the rear lens assembly 30 has a net focusing power of about −2.5 dioptres and the front lens assembly 20 has a net focusing power of about +2.5 dioptres, with the membrane 26 being in its maximal distended state as described above. Meanwhile, when the net focusing power of the rear lens assembly 30 is reduced, e.g. about −0.5 dioptres as shown in FIG. 1D, the net focusing power of the front lens assembly 20 remains substantially equal and opposite, e.g. about +0.5 dioptres, with the membrane 26 in a less distended state. In this way, the image plane of the virtual bee V or other image conveyed by the light emitted from the waveguide display 40 can be adjusted as desired, while the user continues to perceive the real foxglove R, as well as any other real objects in his or her field of view, at their actual distances.

The adjustment mechanism is configured for simultaneous operation of the front and rear lens assemblies 20, 30 in an inverse manner such that the focusing powers of the front and rear lens assemblies 20, 30 remain substantially equal and opposite regardless of the focusing power of the rear lens assembly 30. This is particularly useful when two augmented reality display units of the kind shown in FIGS. 1A-1D are used in a binocular fashion to form a stereoscopic image in which a virtual object is displayed with a degree of parallax corresponding to a virtual distance from the user. To avoid vergence-accommodation conflict (VAC), the image plane of the virtual object can be manipulated using both augmented reality display units to coincide with the virtual object's degree of parallax so that the user verges and accommodates to the same image plane.

Example 1: Augmented Reality Display Unit

Figure 2:
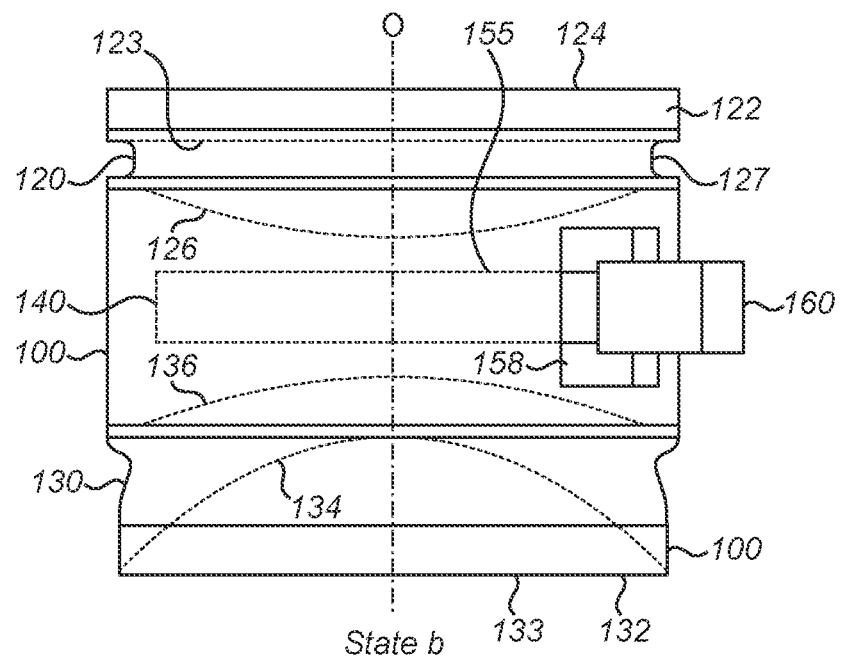
FIG. 2 is a plan view of an augmented reality display unit in accordance with a first embodiment of the present invention. The augmented reality display unit comprises front and rear variable focusing power compressible liquid lens assemblies, each of which has circular front and rear optical outer surfaces, one of which is of fixed focusing power provided by a surface of a hard lens, and the other is of variable focusing power provided by a surface of a distensible membrane. The augmented display unit also comprises an interposed waveguide display. The front and rear optical outer surfaces of both front and rear compressible liquid lens assemblies and the waveguide display are indicated in dashed lines.
Figure 3:
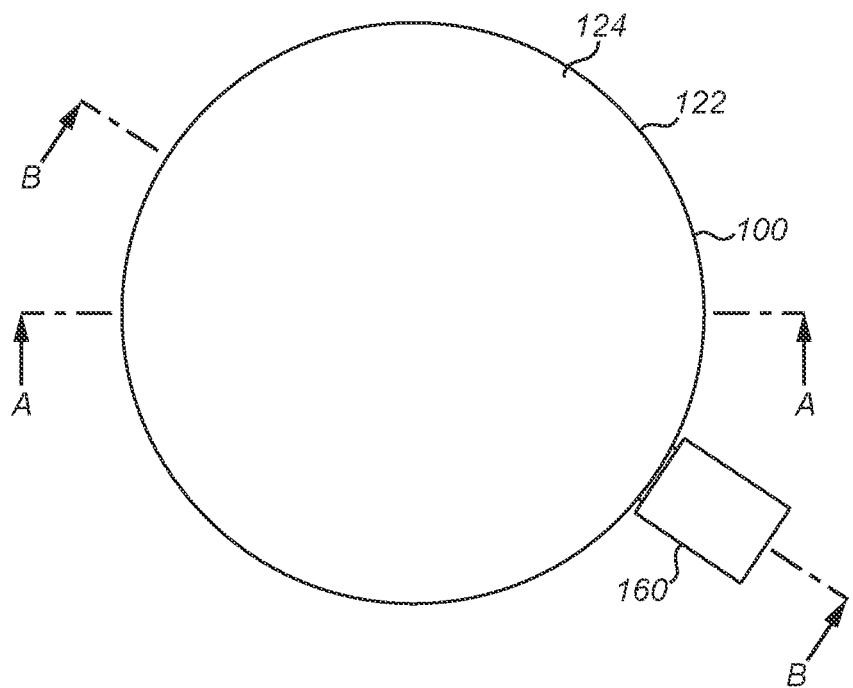
FIG. 3 is a front elevation of the augmented reality display unit of FIG. 2.
Figure 4:
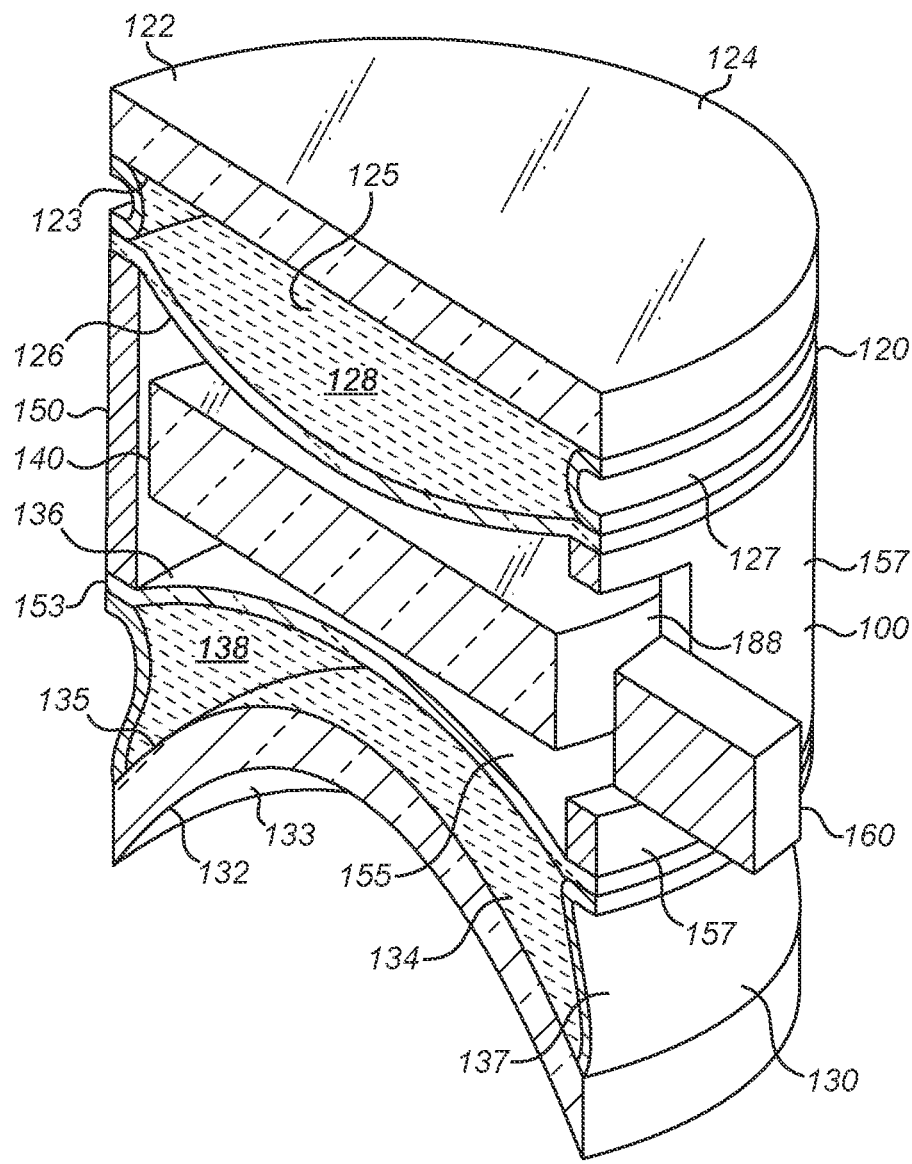
FIG. 4 is a perspective view from the front and to one side of the augmented reality display unit of FIGS. 2 and 3 which is shown in cross-section along the line B-B of FIG. 3.

FIGS. 2-4 show an augmented reality display unit 100 in accordance with a first embodiment of the present invention. Broadly speaking, the augmented reality display unit 100 has a similar arrangement to the augmented reality display unit described above with reference to FIGS. 1A-1D, in that it includes a front variable focusing power compressible liquid lens assembly 120, a rear variable focusing power compressible liquid lens assembly 130 and an intermediate transparent waveguide display 140.

A difference from the augmented reality display unit of FIGS. 1A-1D, which is immediately obvious from inspection of FIG. 4, is that in the augmented reality display unit 100 of the present embodiment, the front compressible liquid lens assembly 120 is arranged an opposite way round from the front compressible liquid lens assembly 20 of FIGS. 1A-1D, in that it has a distensible membrane 126 that is disposed behind a optically clear hard front plate 122, such that the membrane 126 faces towards the transparent waveguide display 140, whereas in FIGS. 1A-1D, the membrane 26 is disposed in front of the hard rear lens 22 and faces away from the transparent waveguide display 40. However, the orientation of the front (or rear) compressible liquid lens assembly 120 (or 130) is not an essential feature of the present invention, and those skilled in the art will readily be able to adapt the components of the augmented reality display unit 100 and their arrangement to orient the front and rear compressible liquid lens assemblies 120, 130 as desired according to the end-use of the display unit 100. It is important that the front and rear compressible liquid lens assemblies 120, 130 should operate as conjugate variable focusing power lenses as described above in relation to FIGS. 1A-1D and in greater detail below.

As best shown in FIG. 4, therefore, the augmented reality display unit 100 comprises a circular, optically clear hard front plate 122 having planar rear and front surfaces 123, 124 respectively, such that the hard front plate 122 has substantially no intrinsic focusing power, although in other embodiments, the hard front plate 122 may be replaced by a hard front lens having a fixed focusing power of up to about +4.0 dioptres, typically up to about +1.0 dioptres or +2.0 dioptres. The rear surface 123 of the front plate 122 forms a hard front wall of a fluid-filled envelope 125 which is filled with a sensibly incompressible, optically clear refractive fluid 128.

A collapsible sidewall 127 of annular cross-section extends circumferentially around the envelope 125 as indicated in FIG. 4 and is bonded at or towards a front end to the rear face 123 of the front plate 122. The collapsible side wall 127 is also bonded at or towards a rear end to a front surface of a circular distensible membrane 126, around the periphery of the membrane 126. A rear surface of the membrane 126 is bonded to an annular front end 152 of an oscillating cylindrical collar 150 which extends rearwardly from the front compressible liquid lens assembly 120. The membrane 126 is thus sandwiched between the collapsible side wall 127 and the cylindrical collar 150 and is pre-tensioned to a line tension of at least 180 N/m as described in WO 2017/055787 A2, the contents of which are incorporated herein by reference.

Figure 5A:
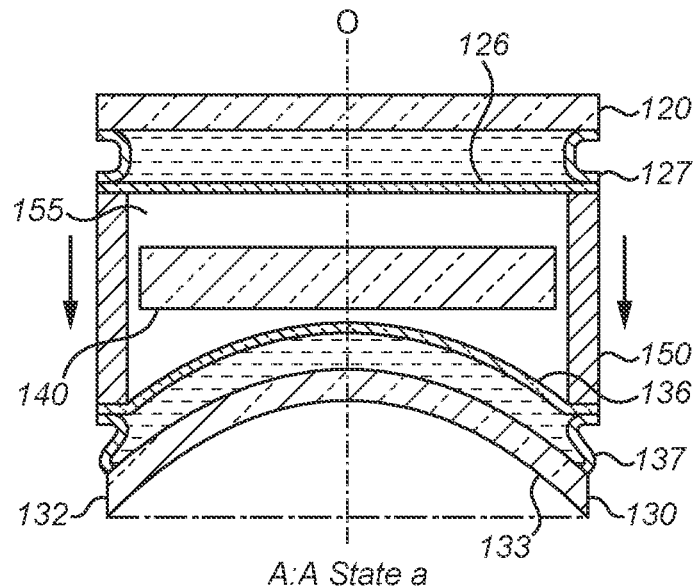
FIGS. 5A-5C are series of cross-sectional views of the augmented reality display unit of FIGS. 2-4 along the line A-A of FIG. 3. In each of FIGS. 5A-5C, the distensible membranes of the front and rear compressible liquid lens assemblies are shown in different actuation states which combine to produce the same net focusing power.
Figure 5B:
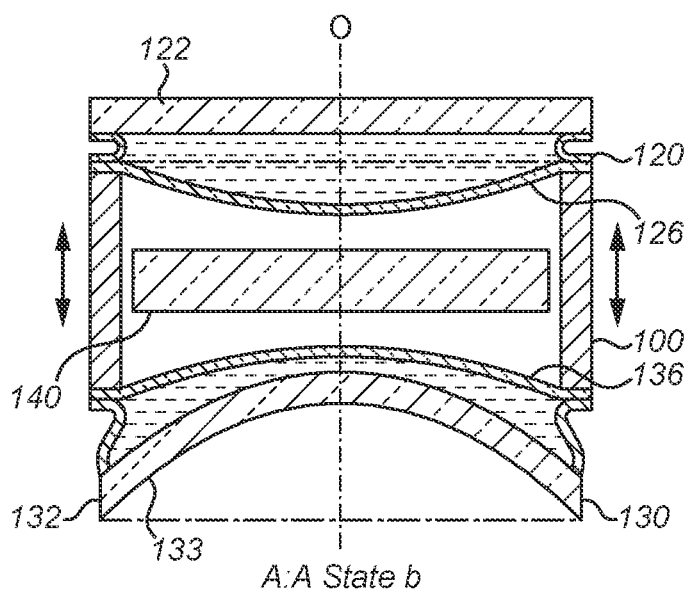
Figure 5C:
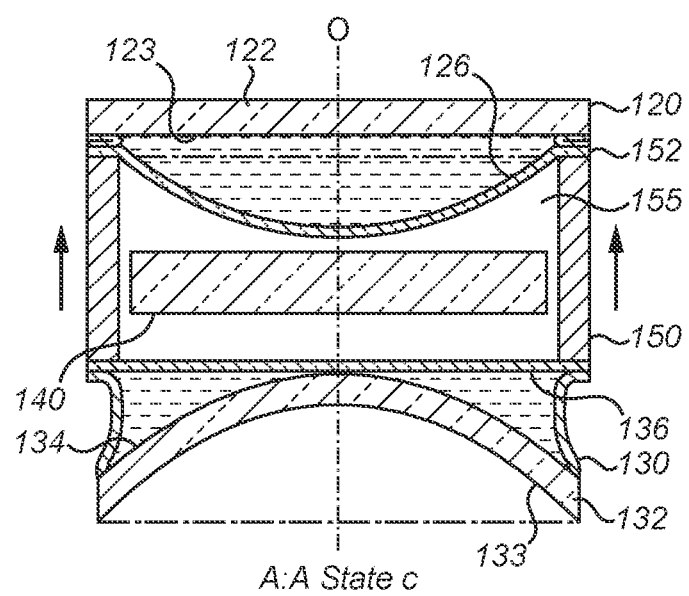

The oscillating collar 150 is mounted for oscillation forwards and backwards on an optical axis O of the augmented reality display unit 100, as shown in FIGS. 5A-5C, and consists essentially of a cylindrical wall that surrounds and defines a cylindrical recess 155 within the augmented reality display unit 100. The cylindrical wall has an exterior surface 157 to which a part (not shown) is attached which is configured to engage a selectively operable linear actuator for driving the collar 150 backwards and forwards along the optical axis O between the front and rear lens assemblies 120, 130. For example, the part may comprise a rack that is configured to engage a corresponding pinion which is arranged to be driven by an electric motor or the like (not shown).

The transparent waveguide display 140 is accommodated within the cylindrical recess 155 behind the front compressible liquid lens assembly 120. The cylindrical wall is provided with a window 158, as best shown in FIGS. 2 and 4, for coupling the waveguide display 140 to a projector, which is indicated schematically at 160. As shown in FIG. 2, the waveguide display 140 is arranged substantially orthogonally to the optical axis O.

A rear end 153 of the collar 150 is bonded to a front face of a distensible membrane 136 of the rear compressible liquid lens assembly 130, with the rear lens assembly 130 being disposed behind the waveguide display 140. The distensible membrane 136 forms a front wall of a fluid-filled envelope 135 which is filled with a sensibly incompressible, optically clear refractory fluid 138. The envelope 135 is surrounded by a collapsible sidewall 137 of annular cross-section which is bonded at or towards a front end to a rear face of the membrane 136, such that the distensible membrane 136 is sandwiched between the rear end 153 of the collar 150 and the front end of the collapsible side wall 137, and at or towards a rear end to a front surface 134 of a hard rear lens 132, which also has a rear surface 133.

Unlike the hard front plate 122, which is planar, the hard rear lens 132 is a meniscus lens in which the front surface 134 is convex and the rear surface 133 is concave, such that the rear surface 133 has a fixed negative focusing power of about −2.0 dioptres. Those skilled in the art will appreciate that the curvature of the rear surface 133 of the rear lens 132 as shown in FIGS. 2, 4 and 5A to 5C is much greater (more negative) than −2.0 dioptres, the curvature of the rear surface 133 in those drawings having been exaggerated for the purposes of illustration. The curvatures of the membranes 126 and 136 as shown in the drawings are similarly schematic. In other embodiments, the focusing power of the rear surface 133 of the rear lens 132 may be in the range of about −1.0 to about −3.0 dioptres.

The front plate 122 and rear lens 132 may be made from the same or different materials, but are generally made from formed from a hard, optically clear material of the kind that is commonly used for making ophthalmic lenses.

The collapsible side walls 127, 137 of the front and rear liquid lens assemblies 120, 130 may also be made from the same or different materials. In the present embodiment, they are both made from an optically clear, flexible thermoplastic polyurethane (e.g. Tuftane®, which is commercially available from Messrs. Permali Gloucester Ltd, Gloucester, UK). The collapsible side walls 127, 137 are bonded to the front plate 122 and rear lens 132 respectively using a suitable adhesive such, for example, as an epoxy (e.g. Delo® MF643 UV curing epoxy adhesive) or other means known in the art such as ultrasonic welding.

The membranes 126, 136 of the front and rear lens assemblies 120, 130 may be made from the same or different materials, but in the present embodiment they are both made from a thermoplastic polyurethane sheet (e.g. Elastollan® 1185A10, which is commercially available from Messrs. BASF) having a thickness of about 220 µm. Other suitable materials that may be used for the membranes 126, 136, as well as the other components of the front and rear lens assemblies 120, 130, are disclosed by WO 2017/055787 A2.

The collapsible side walls 127, 137 are bonded to the membranes 126, 136 respectively using a light curable adhesive (e.g. Delo® MF643 UV curing epoxy adhesive), which is also used for bonding the membranes 126, 136 to the front and rear ends 152, 153 of the collar 150. Again, other suitable alternative adhesives and joining methods are known and available to those skilled in the art.

The refractive fluids 128, 138 that are used to fill the envelopes 125, 135 of the front and rear liquid lens assemblies 120, 130 respectively may be the same or different from one another. Conveniently, the refractive fluids 128, 138 may be the same as one another, especially where the same material is used to form the distensible membranes 126, 136 of the front and rear liquid lens assemblies 120, 130.

The refractive fluids 128, 138 should be should be colourless and have a refractive index of at least about 1.5. Suitably the refractive index of each refractive fluid 128, 138 should be matched to its respective membrane 126, 136, so that the interface between the membrane 126, 136 and associated fluid 128, 138 is substantially imperceptible to the user. The refractive fluids should have low toxicity and low volatility; they should be inert and exhibit no phase change above about −10° C. or below about 100° C. The fluids 128, 138 should be stable at high temperatures of at least about 80° C. and exhibit low microbial growth. In some embodiments, the fluids 128, 138 may have a density of about 1 g/cm$^3$. Various suitable fluids are available to those skilled in the art, including silicone oils and siloxanes such, for example, as phenylated siloxanes. A preferred fluid is pentaphenyltrimethyltrisiloxane.

In the present embodiment, the membranes 126, 136 are both formed from a polyether polyurethane (e.g. Elastollan® 1185) and the both fluids 128, 138 are a phenylated siloxane, e.g. pentaphenyltrimethyltrisiloxane. The refractive indexes of the membrane material and fluids are suitably the same or substantially the same and are at least 1.5.

The augmented reality display unit 100 is designed to be mounted in a suitable frame or other structure that holds the front plate 122 and rear lens 132 at a fixed distance apart from one another whilst allowing the collar 150 to oscillate on the optical axis O between the front plate 122 and rear lens 132 between state a shown in FIG. 5A and state c shown in FIG. 5C. It will be appreciated that when the collar 150 is moved forwards on the optical axis O, the collapsible side wall 127 of the front compressible liquid lens assembly 120 is progressively compressed between the collar 150 and the front plate 122 which is held fixedly by the frame or other structure as mentioned above, as shown in FIGS. 5B and 5C. Such compression of the fluid-filled envelope 125 of the front lens assembly 120 results in an increase in the pressure of the fluid 128 within the envelope 125, with the consequence that the distensible membrane 126 distends rearwardly with increasing curvature as the pressure within the envelope 125 increases. Since the membrane 126 is circular, it distends spherically or nearly spherically forming an optical lens surface.

In a similar manner, when the collar 150 is moved rearwardly on the optical axis O, the collapsible side wall 137 of the rear liquid lens assembly 130 is compressed between the collar 150 and the hard rear lens 132 which, as mentioned above, is also held fixedly within the frame or other structure, thereby causing the membrane 136 of the rear lens assembly 130 to distend forwardly with increasing curvature as the pressure in the fluid-filled envelope 135 of the rear lens assembly 130 increases, as shown in FIGS. 5B and 5A. As with the membrane 126 of the front lens assembly 120, the membrane 136, being circular, also distends spherically or nearly spherically to form an optical lens surface.

It will also be appreciated that when the collar 150 is moved forwards, the collapsible side wall 137 of the rear lens assembly 130 is extended, allowing the membrane 136 of the rear lens assembly 130 to relax and decreasing the pressure within the envelope 135 as shown in FIGS. 5B and 5C, while moving the collar 150 rearwards allows the membrane 126 of the front lens assembly 122 relax and the pressure within the envelope 125 to decrease, as shown in FIGS. 5B and 5A.

In this way, actuation of the front and rear compressible liquid lens assemblies 120, 130 is coupled by the oscillating collar 150 such that as the curvature of the membrane 126 of the front liquid lens assembly 120 is progressively increased, the curvature of the membrane 136 of the rear liquid lens assembly 130 is progressively decreased and vice versa. Accordingly, when the potential energy stored in the front compressible liquid lens assembly 120 is increased, the potential energy stored in the rear compressible liquid lens assembly 130 is released and vice versa.

As mentioned above, the membranes 126, 136 of the front and rear lens assemblies 120, 130 respectively are pretensioned to a line tension of at least about 180 N/m. When the oscillating collar 150 is disposed in an intermediate state (state b) between the front and rear lens assemblies 120, 130 as shown in FIGS. 2, 4 and 5B, the front and rear membranes 126, 136 each have a curvature of about +1.0 dioptres, with both membranes 126, 136 being distended inwardly towards the waveguide display 140. Since the front plate 122 has no or nearly no focusing power, while the rear surface 133 of the rear lens 132 has a focusing power of about −2.0 dioptres, the net focusing power of the augmented reality display unit 100 is zero or substantially zero. However, a net focusing power of about −1.0 dioptres is applied to light emitted rearwardly from the waveguide display 140 which passes only through the rear lens assembly 130. In this way, the focusing power of the rear lens assembly 130 can be used to alter the apparent focal plane of an image conveyed by light emitted from the waveguide display 140, as described above in relation to FIGS. 1A-1D.

If it is desired to bring the apparent focal plane of an image conveyed by light emitted from the waveguide display 140 closer to the user, the collar 150 can be driven forwards as shown in FIG. 5C to decrease the curvature of the membrane 136 of the rear lens assembly 130 until it is planar or nearly planar, such that the net focusing power of the rear lens assembly 130 is about −2.0 dioptres (state c). As described above, moving the collar 150 forwards on the optical axis O increases the curvature of the membrane 126 of the front lens assembly 120, and in maximally distended state c, as shown in FIG. 5C, the membrane 126 of the front lens assembly 120 has a focusing power of about +2.0 dioptres, so that the net focusing power of the augmented reality display unit 100 remains zero or nearly zero such that light passing through the entire unit 100 from outside is substantially unaffected by the front and rear lens assemblies 120, 130.

It will also be noted from FIG. 5C that the maximum focusing power of the front membrane 126 is limited by the clearance between the rear surface 123 of the front plate and the front end 152 of the collar 150, while the minimum thickness of the rear lens assembly 130 is limited by the clearance between the rear membrane 136 and the front surface 134 hard rear lens 132 on the optical axis O, i.e. at the optical centre of the rear lens 132.

In the present embodiment, each of the front and rear membranes 126, 136 has a baseline focusing power of about 0 dioptres and a maximum focusing power of about +2.0 dioptres. However, it will be understood that in other embodiments, each of the front and rear membranes 126, 136 may (independently) have baseline focusing powers of up to about +1.0 dioptres and may be adjustable in the range of about 1.0 to about 3.0 dioptres.

If it is desired to move the apparent focal plane of an image conveyed by light emitted from the waveguide display 140 away from the user towards infinity, the oscillating collar 150 may be move rearwardly as shown in FIG. 5A to compress the collapsible side wall 137 of the rear lens assembly 130, increasing the focusing power of the membrane 136 to a maximal focusing power of about +2.0 dioptres (state a), negating the negative focusing power of the rear surface 133 of the rear lens 132. As the collar 150 is moved rearwards along the optical axis O, the collapsible side wall 127 of the front lens assembly 120 is extended, reducing the curvature of the membrane 126 of the front lens assembly and reducing its focusing power to a minimal focusing power in state a of about 0 dioptres, such that the net focusing power of the augmented reality display unit 100 remains about 0 dioptres.

The components of the augmented reality display unit 100, including the collar 150 are dimensioned such that the separation between the waveguide display 140 and front and rear membranes 126, 136 respectively is sufficient to accommodate the membranes 126, 130 in their fully distended states a and c as shown in FIGS. 5A and 5C without impinging on the waveguide display 140. Further, the components of the unit 100 as described above are configured and arranged such that the front and rear membranes 126, 136 operate as a conjugate pair with their individual focusing powers always adding together to a total focusing power of about +2.0 dioptres, regardless of the actual position of the collar 150 between the front and rear assemblies 120, 130, to negate the fixed focusing power of −2.0 dioptres of the rear surface 133 of the hard rear lens 132.

Advantageously, in accordance with the present invention, the front and rear compressible liquid lens assemblies 120, 130 are coupled together by the oscillating collar 150 such that when one of the lens assemblies 120, 130 is compressed to increase the focusing power of its membrane 126, 136, the other lens assembly 130, 120 is expanded to decrease the focusing power of its membrane 136, 126, such that the front and rear lens assemblies 120, 130 operate as a conjugate pair. Potential energy released from one lens assembly 120, 130 that is expanded when the collar 150 is moved is expended as work done in driving the collar 150 to compress the other lens assembly 130, 120 that is compressed. Thus, coupling the front and rear compressible liquid lens assemblies 120, 130 together using the collar 150 facilitates in moving the collar 150 backwards and forwards between the front and rear lens assemblies 120, 130, thereby reducing the energy requirement of a power supply for an actuator of the kind mentioned above for actively driving the collar 150. In this way, an augmented reality headset or other device incorporating one or more augmented reality display units 100 in accordance with the invention may be made smaller and/or lighter with a smaller power supply.

In the augmented reality display unit 100 shown in FIGS. 2-4, the optical axis O passes through the geometric centre of each of the front and rear lens assemblies 120, 130. However, in some augmented reality display units, the optical axis O may be located non-centrally relative to the front and rear lens assemblies 120, 130. It is well known that the optical axis of an ophthalmic lens is often located off-centre of the lens to ensure that the lens is centred correctly for a given user, i.e. so that the optical centre of the lens is correctly aligned with the user's centration point. Advantageously, an augmented reality display unit in accordance with the invention having front and rear compressible liquid lens assemblies may be configured to optimise the thickness and weight of the unit, particularly where the optical axis is located off-centre relative to the front and rear lens assemblies, as described below.

Figure 6:
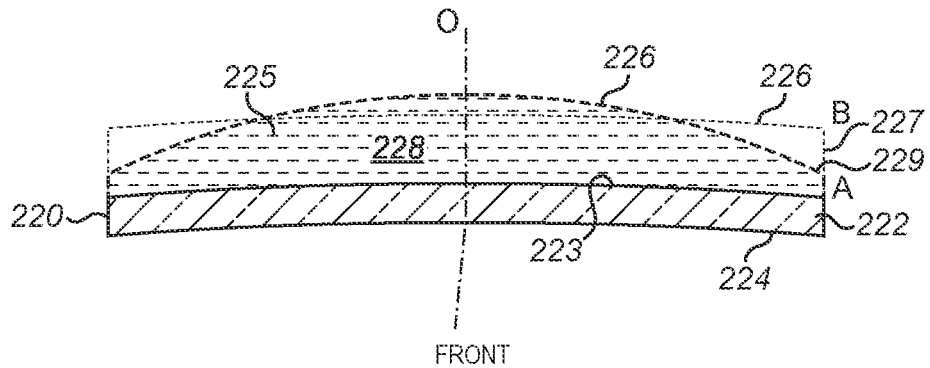
FIG. 6 is a schematic representation of a front compressible liquid lens assembly of the kind included in the augmented reality display unit of FIGS. 2-5 with a centrally located optical axis.

FIG. 6 illustrates schematically a front compressible liquid lens assembly 220 for use in an augmented reality display unit according to the invention. The front lens assembly 220 has a hard plate or lens 222 of fixed focusing power, a collapsible side wall 227 and a distensible membrane 226 that is held around its edge 229 under tension which define an envelope 225 is filled with a refractive fluid 228. The collapsible side wall 227 is compressible between states A and B as shown in FIG. 6 in which the membrane 226 is respectively maximally distended away from the hard plate or lens 222 and minimally distended. The hard plate or lens 222 has a first surface 223 which is interior to the cavity 225 and a second surface 224 which is exterior of the cavity. The augmented reality display unit has an optical axis O that is centrally located relative to the lens assembly 220. As described above in relation to FIG. 5C, the maximum distended state of the membrane 226 (state A) is limited by the clearance between the first surface 223 of the hard lens or plate 222 and the edge 229 of the membrane 226.

Figure 7:
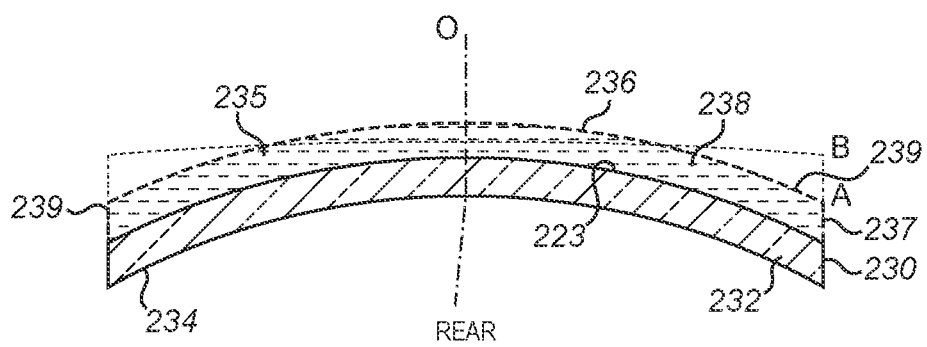
FIG. 7 is a schematic representation of a rear compressible liquid lens assembly of the kind included in the augmented reality display unit of FIGS. 2-5 with a centrally located optical axis.

FIG. 7 shows schematically a rear compressible liquid lens assembly 230 for use with the front lens assembly 220 in an augmented reality display unit according to the invention. The rear lens assembly 230 includes a hard lens 232, a collapsible sidewall 237 and a distensible membrane 236 which is held around its edge 239 under tension. The hard lens 232 has a first interior surface 233 and a second exterior surface 234 which is concave such that the second surface 234 has a negative fixed focusing power. The first surface 233 of the hard lens 232 defines an envelope 235 with the membrane 236 and collapsible side wall 237 which is filled with a refractive fluid 238. As with the collapsible side wall 227 of the front lens assembly 220, the collapsible side wall 237 of the rear lens assembly 230 is compressible between states A and B as shown in FIG. 7. In state A, the membrane 236 is maximally distended, having a curvature corresponding substantially to the curvature of the second surface 234 of the hard lens 232, such that the net focusing power of the rear lens assembly 230 is approximately zero. In its minimally distended state B, the membrane 236 has substantially no focusing power, so that the net focusing power of the rear lens assembly 230 is substantially equal to the focusing power of the second surface 234 of the hard lens 232. As described above in relation to FIG. 5C, the minimum thickness of the rear lens assembly 230 is governed by the minimum clearance condition between the membrane 236 and the first surface 233 of the hard lens 232 on the optical axis O in state B. In FIG. 7, the optical axis O of the augmented reality display unit passes through the centre of the rear lens assembly 230.

Figure 8:
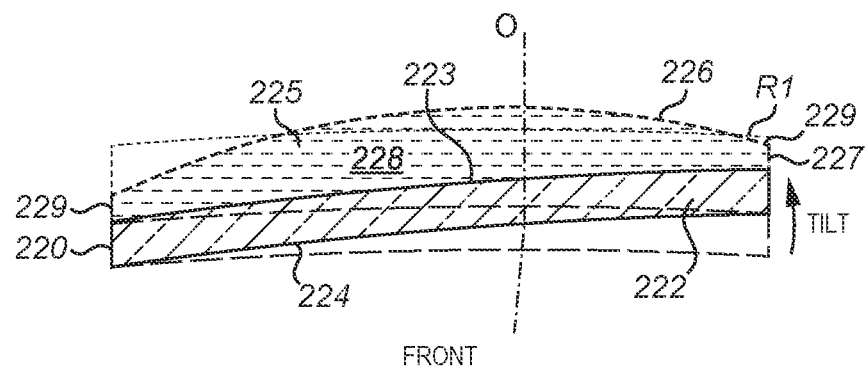
FIG. 8 is a schematic representation of a front compressible liquid lens assembly for use in an augmented reality display unit of the present invention, in which the optical axis is off-centre and the hard lens is tilted with respect to the optical axis.

As shown in FIG. 8, the augmented reality display unit is modified by arranging its optical axis O off-centre towards a first region R1 of the edge of the membrane 226. The thickness of the front lens assembly 220 can be reduced in accordance with the invention by tilting the hard plate or lens 222 relative to the optical axis O towards the first region R1 of the edge of the membrane 226. In this way, the hard plate or lens 222 is disposed closer to the edge of the membrane 229 adjacent the first region R1 without adversely affecting the minimum clearance condition between the edge 229 of the membrane 226 and the first surface 223 of the hard lens or plate 222. In turn, this allows the front lens assembly 220 to be filled with a reduced quantity of refractive fluid 228.

Figure 9A:
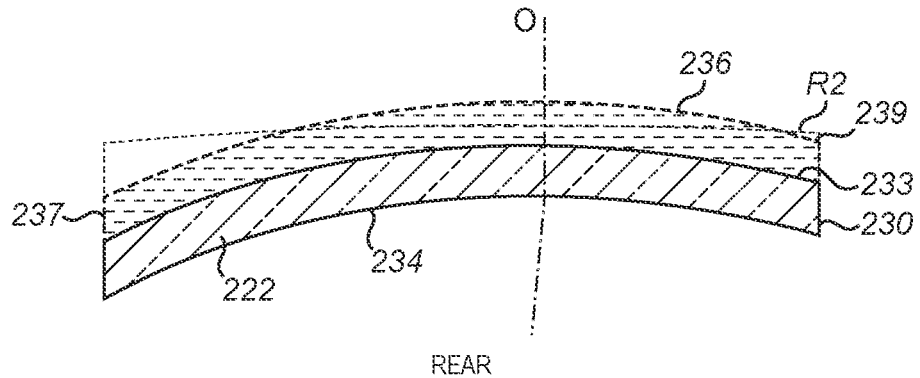
FIGS. 9A-9C are series of schematic representations of a rear compressible liquid lens assembly for use in an augmented reality display unit of the present invention, in which the optical axis is off-centre.
Figure 9B:
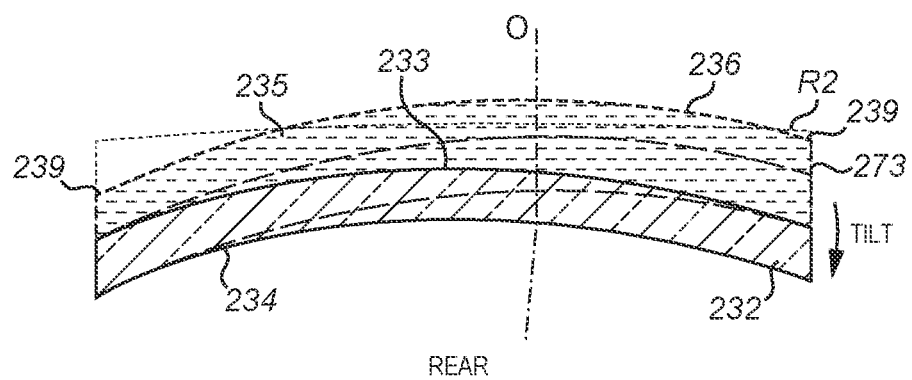
Figure 9C:
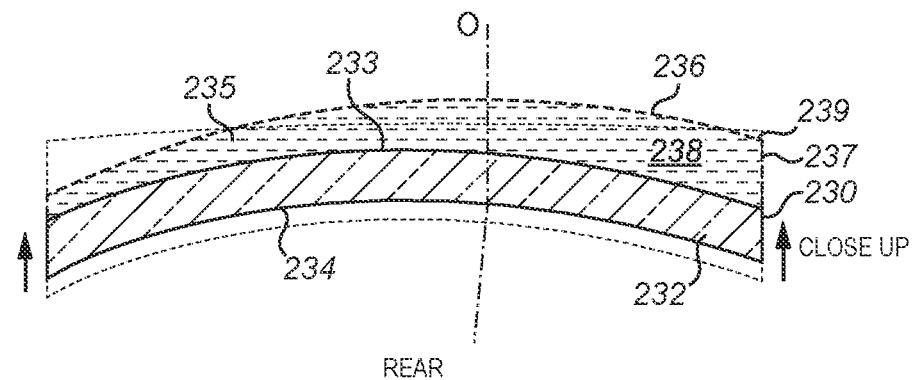

An effect of tilting the hard lens or plate 222 relative to the optical axis O as described above is to introduce a degree of prism to a ray of light passing through the front lens assembly 220. This can be substantially negated for by introducing a substantially equal and opposite degree of prism to the rear compressible liquid lens assembly 230 as illustrated in FIGS. 9A-9C. The rear lens assembly 230, modified to have the optical axis O of the augmented reality display unit off-centre, is shown in FIG. 9A. The optical axis O is closer to a region R2 of the edge 239 of the membrane 236 than it is to other regions of the edge 239. Region R2 of the edge of the membrane 236 of the rear lens assembly 230 corresponds to and is aligned with region R1 of the edge 229 of the membrane 226 of the front lens assembly 220.

In FIG. 9B, the hard lens 232 is tilted relative to the optical axis O to move the hard lens 232 away from the region R2 of the edge 239 of the membrane 236. The amount of tilt of the hard lens 232 is substantially equal and opposite to the amount of tilt of the hard lens or plate 222 of the front lens assembly 220, so that it introduces a degree of prism to the rear lens assembly 230 that is substantially equal and opposite to the degree of prism in the front lens assembly 220 that results from tilting the hard lens or plate 222 of the front lens assembly. Since the minimum thickness of the rear lens assembly 230 is governed by the minimum clearance condition between the membrane 236 and the first surface 233 of the hard lens 232 on the optical axis O, as described above, by tilting the hard lens 232 away from the membrane 236, the spacing between the hard lens 232 and membrane 236 can be reduced as compared with the unmodified lens assembly as shown in FIG. 9C, thereby further reducing the thickness of the augmented reality display unit and the amount of fluid 238 needed to fill the envelope 235 of the rear lens assembly 230.

Figure 10:
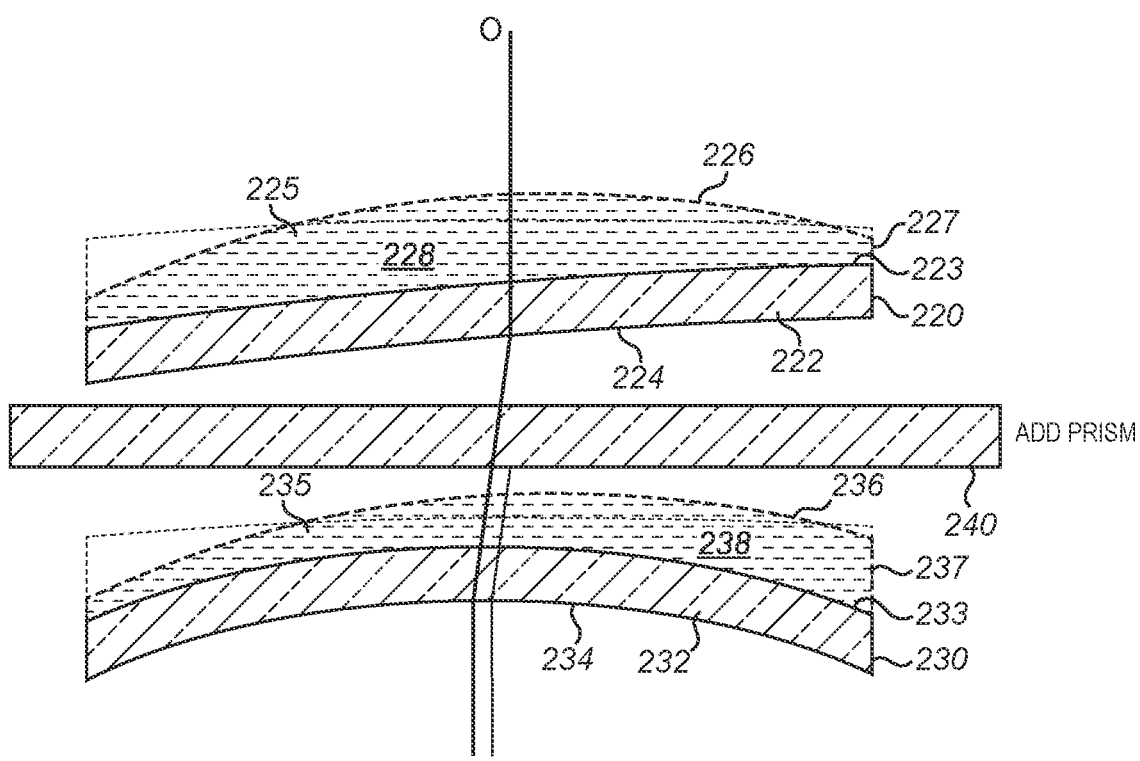
FIG. 10 is a schematic drawing of an augmented reality display unit in accordance with the present invention in which the hard lenses of the front and rear compressible liquid lens assemblies are tilted with respect to the optical axis such that the amount of prism introduced by each is equal and opposite, and the waveguide display is configured to impart an amount of prism to light output from the waveguide display that is equal and opposite to the amount of prism introduced by tilting the hard lens of the rear compressible liquid lens assembly.

It will be understood that while light passing through both front and rear lens assemblies 220, 230 will have a net prism of zero or substantially zero (although the optical axis will be "kinked") as shown in FIG. 10, light emitted by a waveguide display 240 interposed between the front and rear lens assemblies 220, 230 will be affected by the rear lens assembly 230 only. It is therefore necessary to configure the waveguide display 240 (or a projector arranged to input light into the waveguide display 240) to impart a degree of prism to light emitted from the waveguide display 240 towards a user that is substantially equal and opposite to the degree of prism resulting from tilting the hard lens 232 of the rear lens assembly 230.

In a variant of the augmented reality display unit 100 of the present example, one or more of the optical components including the hard front plate 122, hard rear lens 132 and waveguide display 140 may be fabricated on a base curve in a manner well known to those skilled in the art. Where the hard front plate 122 is replaced with such an optical element, the range of curvatures of the distensible membrane 126 should be adjusted accordingly. For example, the hard front plate 122 may be replaced in some embodiments by a hard front lens having zero or nearly zero intrinsic focusing power, but fabricated on a positive base curve, such that the front surface of the hard front lens has a positive curvature, e.g., about +1 dioptre, while the rear surface of the hard front lens has an opposite and substantially equal negative curvature, e.g., about −1 dioptre. In such case, the range of focusing powers of the front membrane 126 should be about −1 dioptre to about +1 dioptre, instead of 0 to +2 dioptres.

Example 2: Augmented Reality Headset

Figure 11:
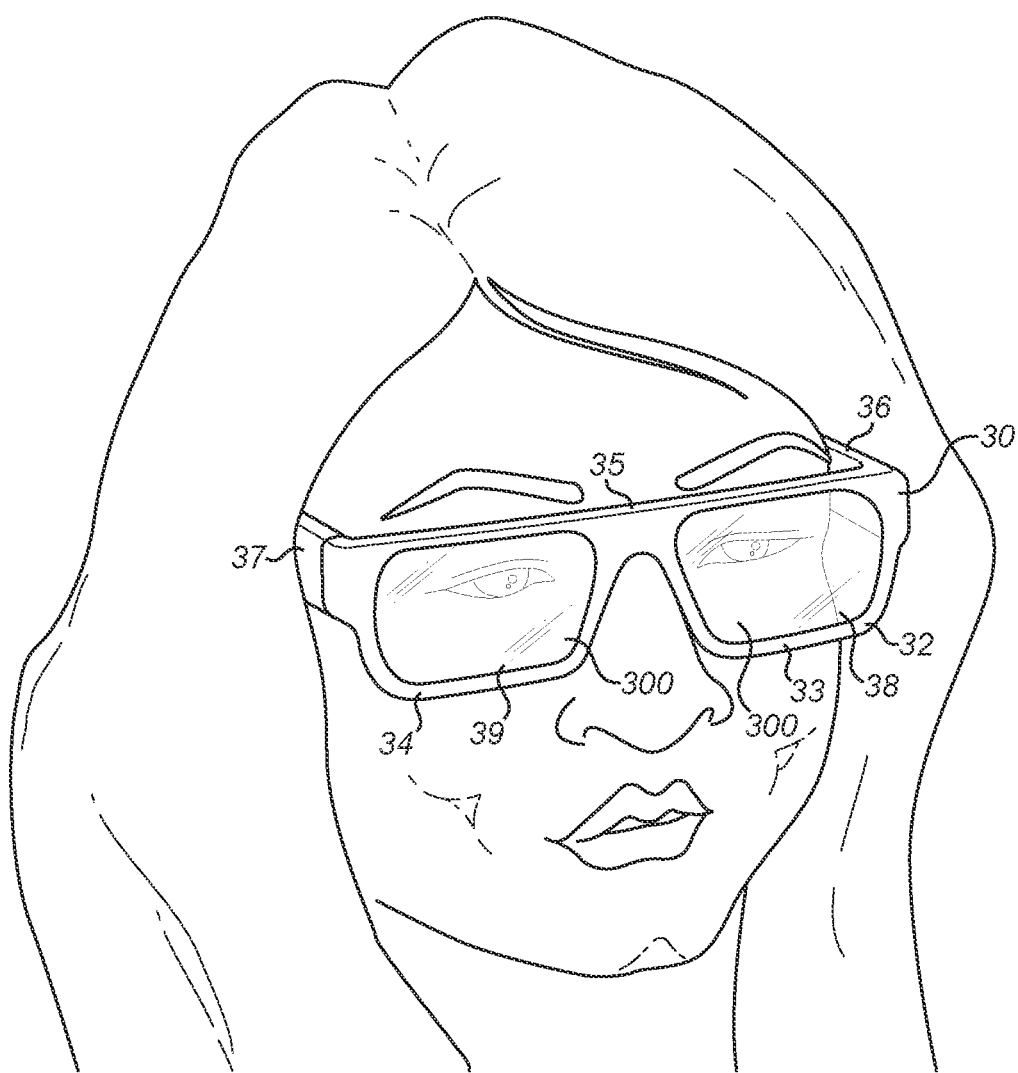
FIG. 11 is a schematic perspective view of an augmented reality headset in accordance with a second embodiment of the present invention, as worn by a user.

FIG. 11 illustrates an augmented reality headset 30 by a user. The headset 30 resembles a pair of glasses having a frame 32 having left and right eye-wire portions 33, 34 respectively, a nose-bridge 35 and left and right temples 36, 37 respectively. Each of the left and right eye-wire portions 33, 34 defines a non-round aperture 38, 39 that is shaped and dimensioned to accommodate a respective augmented reality display unit 300 in accordance with the invention. The display units 300 for the left and right eye-wire portions 33, 34 are similar to one another, but have reflectional symmetry about the user's sagittal plane. Working parts of the left-hand display unit 300 is illustrated in FIGS. 12A, 12B, 13A, 13B, 14A, 14B and 15A, 15B, but the following description is equally applicable to the right-hand display unit 300. In other embodiments, the augmented reality headset may be implemented in the form of goggles or a visor, which may optionally be integrated with a helmet in the form of a head-up display or helmet mounted display. As described in detail below, the augmented reality display units 300 incorporated in the headset 30 embody one or more of the same inventive concepts as described above in relation Example 1.

Figure 12A:
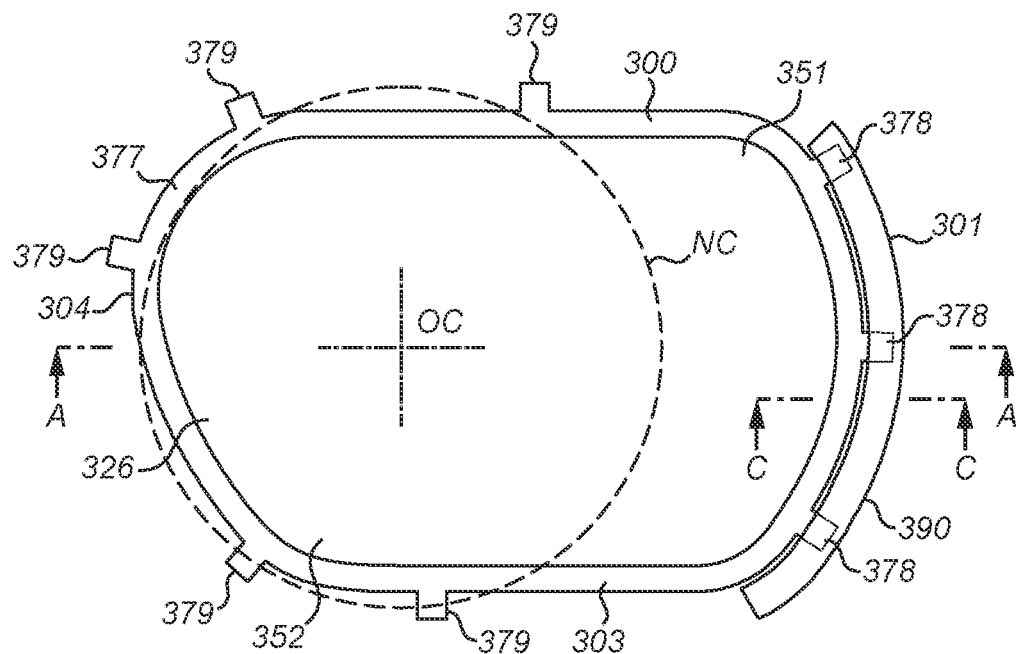
FIG. 12A is a front elevation of a left-side non-round augmented reality display unit in accordance with the invention, which is included in the augmented reality headset of FIG. 11. The left side augmented reality display unit includes an adjustment mechanism which, in FIG. 12A, is shown in a first position.
Figure 12B:
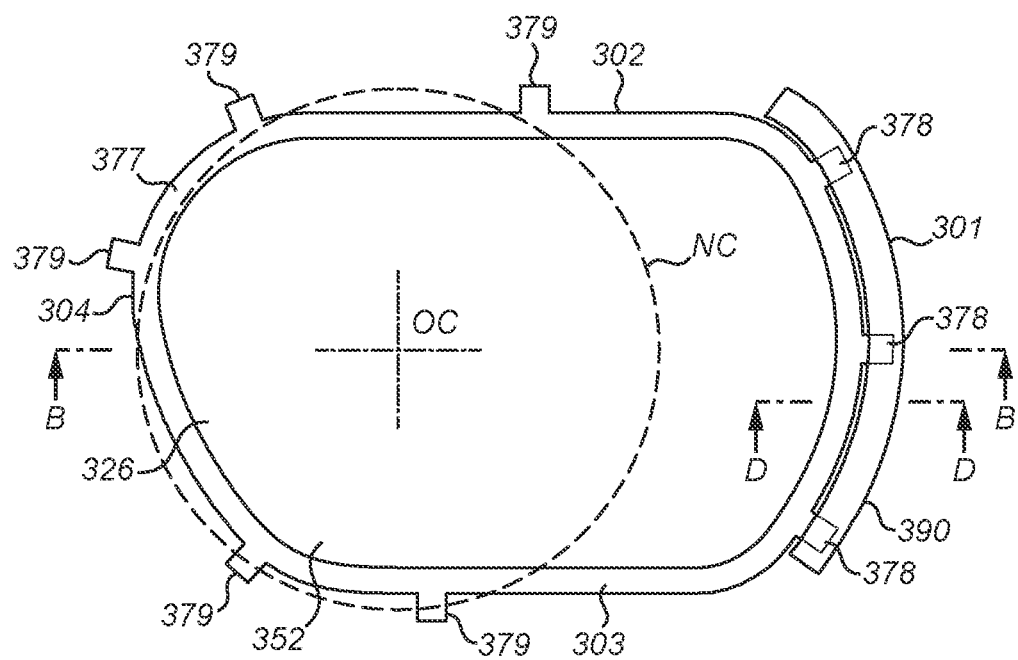
FIG. 12B is another front elevation of the augmented reality display unit of FIG. 12A, with the adjustment mechanism shown in a second position.
Figure 14A:
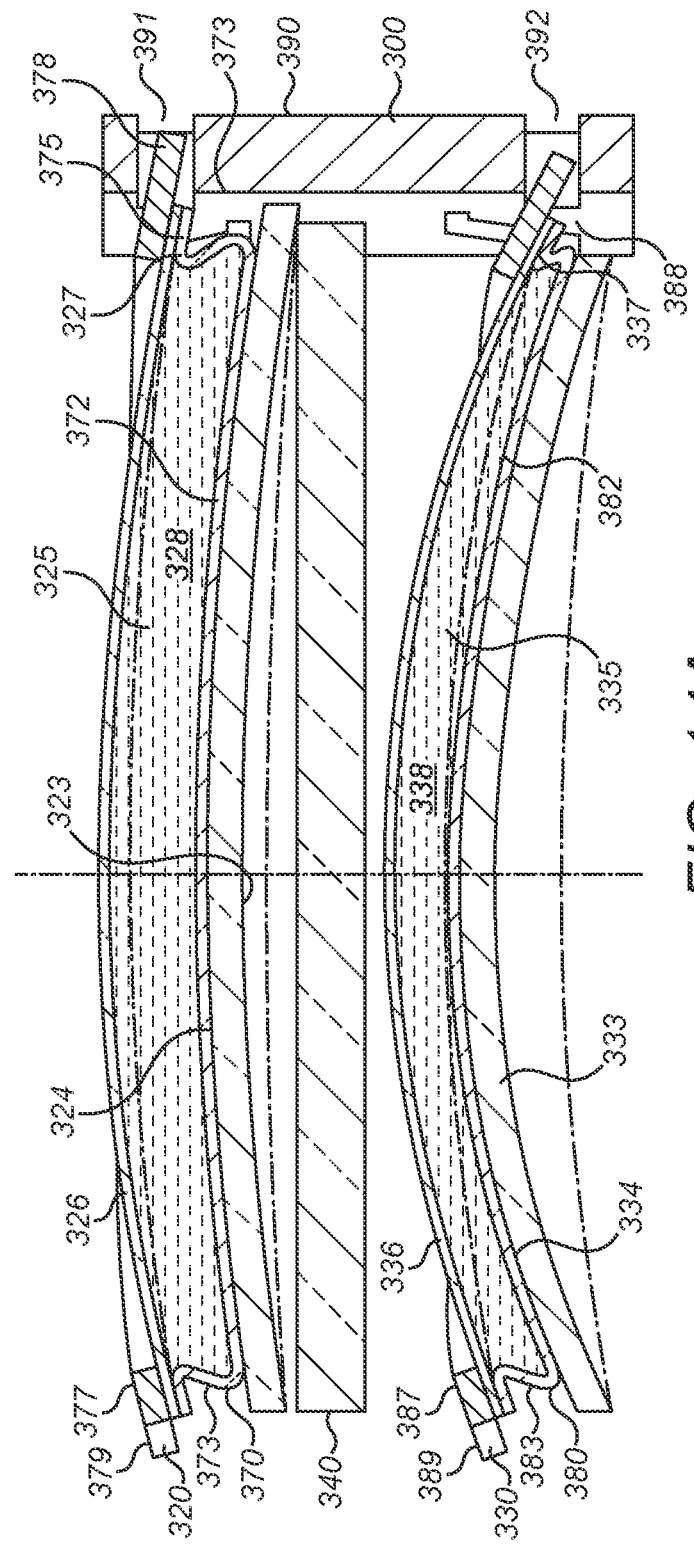
FIG. 14A is a cross-sectional view of the augmented reality display unit of FIGS. 12A, 12B, 13A and 13B on the line A-A as shown in FIG. 12A.
Figure 14B:
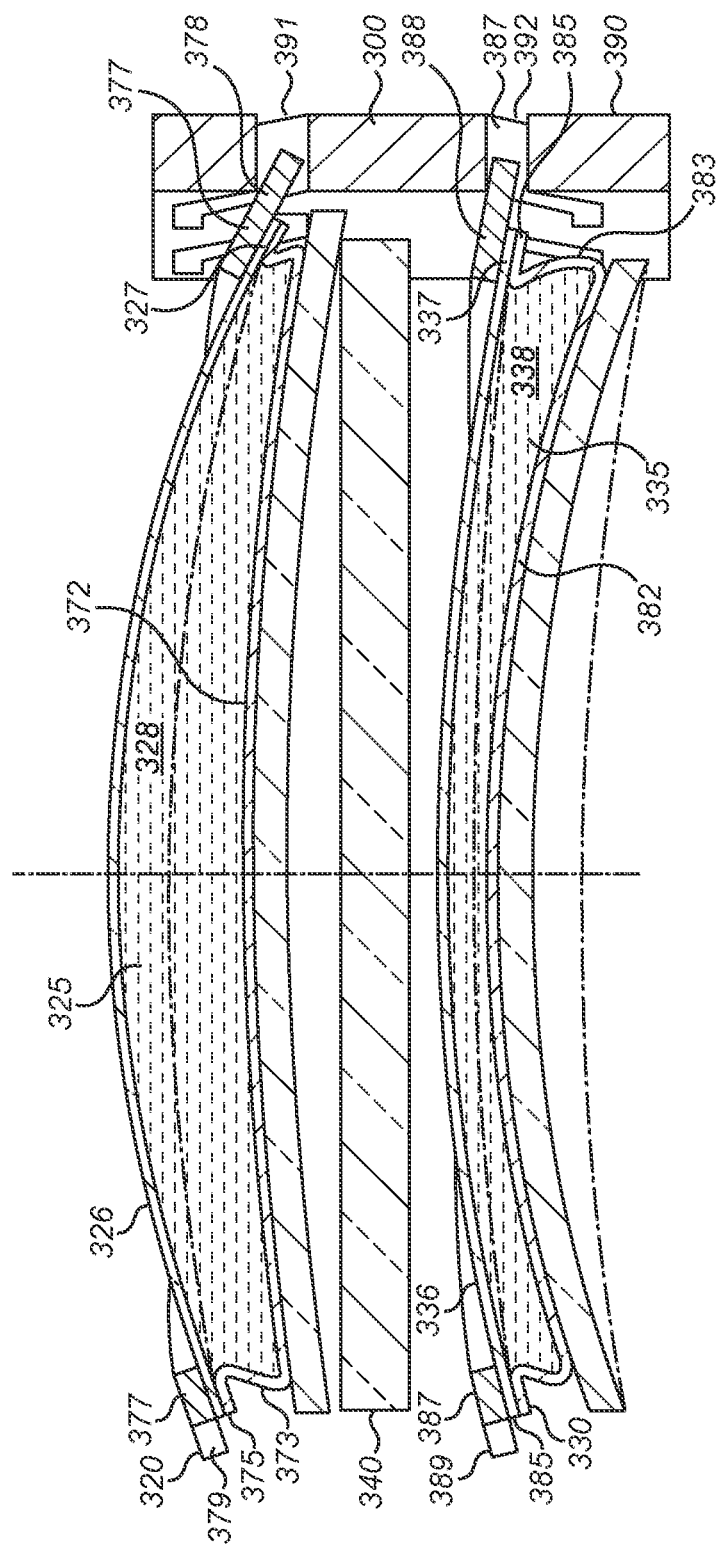
FIG. 14B is a cross-sectional view of the augmented reality display unit of FIGS. 12A, 12B, 13A, 13B and 14A on the line B-B as shown in FIG. 12B.

As best seen in FIGS. 14A and 14B, the augmented reality display unit 300 comprises a front variable focusing power compressible liquid lens assembly 320, a rear variable focusing power compressible liquid lens assembly 330 and an interposed optically clear waveguide display 340. The display unit 300 therefore has a similar architecture to the display units 10 and 100 described above and operates in substantially the same way. A notable difference between the display unit 300 of the present example and the display unit 100 of Example 1, which is most evident from FIGS. 12A and 12B is that in the present embodiment, each of the front and rear lens assemblies 320, 330 has non-round optical surfaces. Non-round compressible liquid lens assemblies are described in WO 2013/144533 A2, WO 2013/144592 A1, WO 2013/143630 A1, WO 2014/125262 A2, WO 2015/044260 A1, United Kingdom patent application no. 1800933.2 and United Kingdom patent application no. 1801905.9, the contents of which are incorporated herein by reference.

In addition to the parts shown in the drawings, the augmented reality display unit 300 also includes a suitable housing (not shown) to accommodate and hold the working parts as described below.

Each of the front and rear liquid lens assemblies 320, 330 comprises a respective generally rectangular hard rear lens 322, 332 having a fixed focusing power. In the present embodiment, each of the front and rear lenses 322, 332 comprises a meniscus lens having a concave rear surface 323, 333 and a convex front surface 324, 334, which is fabricated from any suitable optically clear hard material that is known in the art for making ophthalmic lenses. The front and rear lenses 322, 332 have a similar non-round shape to one another and are mutually aligned with their optical centres disposed on an optical axis z of the display unit 300. The front and rear lenses 322, 332 are each mounted in a fixed position within the housing of the unit 300. Although the lenses 322, 332 are generally rectangular in the present embodiment, the present invention may extend to numerous other eye-shapes of the kind that are used for conventional eyeglasses, e.g. Aviator, butterfly, cat-eye, flat-top, pillowed rectangle, rectangle, square or Wayfarer shapes.

The waveguide display 340 is also mounted in a fixed position between the front and rear lens assemblies 320, 330 within the housing of the unit 300.

It will be observed from FIGS. 14A and 14B that the rear surface 333 of the rear lens 332 has a greater curvature than the rear surface 323 of the front lens 322. In the present embodiment, the rear surface 333 of the rear lens 332 has a focusing power of about −2.5 dioptres, while the rear surface 323 of the front lens 322 has a focussing power of about −0.5 dioptres. More generally, the focusing power of the rear surface 333 of the rear lens 332 may be in the range of about −1.0 to about −3.0 dioptres, while the focusing power of the rear surface 323 of the rear lens 322 may be in the range of about 0 to about −1.0 dioptres.

The front surface 324, 334 of each of the front and rear lenses 322, 332 carries a dish-shaped receptacle 370, 380 (or "bag") comprising a rear wall 372, 382, having a shape that corresponds to the shape of the front surface 324, 334 of the respective lens 322, 332, and an integral collapsible peripheral side wall 373, 383 that extends forwardly from the rear wall 372, 382 and terminates in a peripheral lip 375, 385. In the present embodiment, each of the dish-shaped receptacles 370, 380 is made from an optically clear, flexible thermoplastic polyurethane (e.g. Tuftane®, which is commercially available from Messrs. Permali Gloucester Ltd, Gloucester, UK), and its rear and side walls 372, 373; 382, 383 are about 50 μm thick, but other transparent materials, especially transparent elastomers, may be used and the thickness adjusted accordingly.

The rear wall 372, 382 of each dish-shaped receptacle 370, 380 is bonded contiguously to the front surface 324, 334 of the corresponding hard lens 322, 332 by means of a transparent pressure-sensitive adhesive (PSA) such, for example, as 3M® 8211. In the present embodiment, a layer of PSA about 25 μm thickness is used, but this may be varied as required.

The peripheral lip 375, 385 of each dish-shaped receptacle 370, 380 is joined to a respective distensible membrane 326, 336 having a non-round shape that is similar to the shape of the front and rear lenses 322, 332. Each membrane 326, 336 is formed from a sheet of a thermoplastic polyurethane (e.g. Elastollan® 1185A10, which is commercially available from Messrs. BASF) and has a thickness of about 220 μm. Other suitable materials that may be used for the membrane 326, 336, as well as the other components of the display unit 300, are disclosed by WO 2017/055787 A2.

Each of the membranes 326, 336 is held under tension around its periphery by a respective resiliently bendable support ring 377, 387. As described in more detail below, each of the membranes 326, 336 forms a front optical surface of the respective liquid lens assembly 320, 330, with the net effective focusing power of each lens assembly 320, 330 being determined by the curvature of the membrane 326, 336 and the fixed focusing power of the rear surface 323, 333 of the associated hard lens 322, 332.

Each of the support rings 377, 387 is fabricated from a sheet of stainless steel and has a thickness of about 0.55 mm, but more generally each ring may have a thickness in the range about 0.50-0.60 mm or may comprise a stack of two or more ring elements instead of a single ring. Each membrane 326, 336 is bonded to the respective support ring 377, 387 with a light curable adhesive (e.g. Delo® MF643 UV curing epoxy adhesive) or other means and is held at a line tension of about 200 Nm-1.

The peripheral lip 375, 385 of each dish-shaped receptacle 370, 380 is bonded to a peripheral region 327, 337 of the respective membrane 326, 336 using a suitable adhesive (e.g. Delo® MF643 UV curing epoxy adhesive) or other means such, for example, as ultrasonic welding, laser welding and the like, such that each membrane 326, 336 is sandwiched between the lip 375, 385 of the respective dish-shaped receptacle 370, 380 and the corresponding support ring 377, 387.

Each of the support rings 377, 387 can move towards or away from the respective hard lens 322, 332, with the side wall 373, 383 of the associated dish-shaped receptacle 370, 380 folding on itself or extending respectively to allow such movement.

In other embodiments of the invention, more than one support ring 377, 387 may be used in one or both of the front and rear lens assemblies 320, 330. For example, the membrane 326, 336 may be sandwiched between two similar support rings as described, for example, in WO 2013/144533 A1. In the present embodiment, only one support ring is shown for simplicity.

Each of the support ring 377, 387 is formed with a plurality of integral, peripherally spaced, outwardly protruding tabs, which comprise active tabs 378, 388 and passive tabs 379, 389 as described in more detail below. In FIGS. 12A and 12B, only the active tabs 378 and passive tabs 379 of the support ring 377 of the front lens assembly 320 are visible.

Figure 13A:
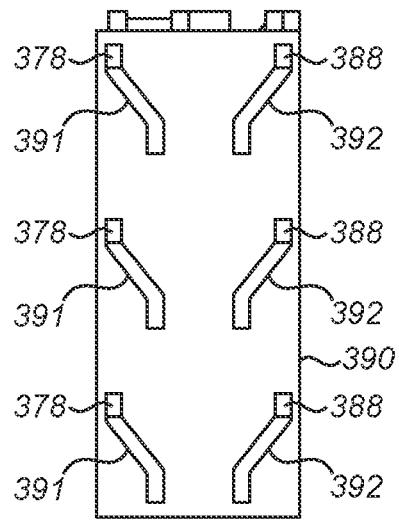
FIG. 13A is a left side elevation of the augmented reality display unit of FIGS. 12A and 12B, with the adjustment mechanism shown in the first position.
Figure 13B:
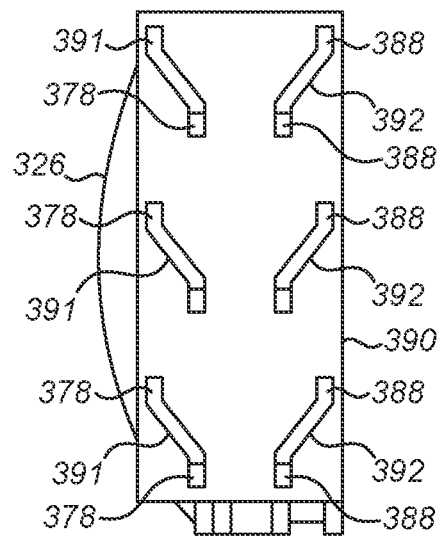
FIG. 13B is another left side elevation of the augmented reality display unit of FIGS. 12A, 12B and 13A with the adjustment mechanism shown in the second position.
Figure 19:
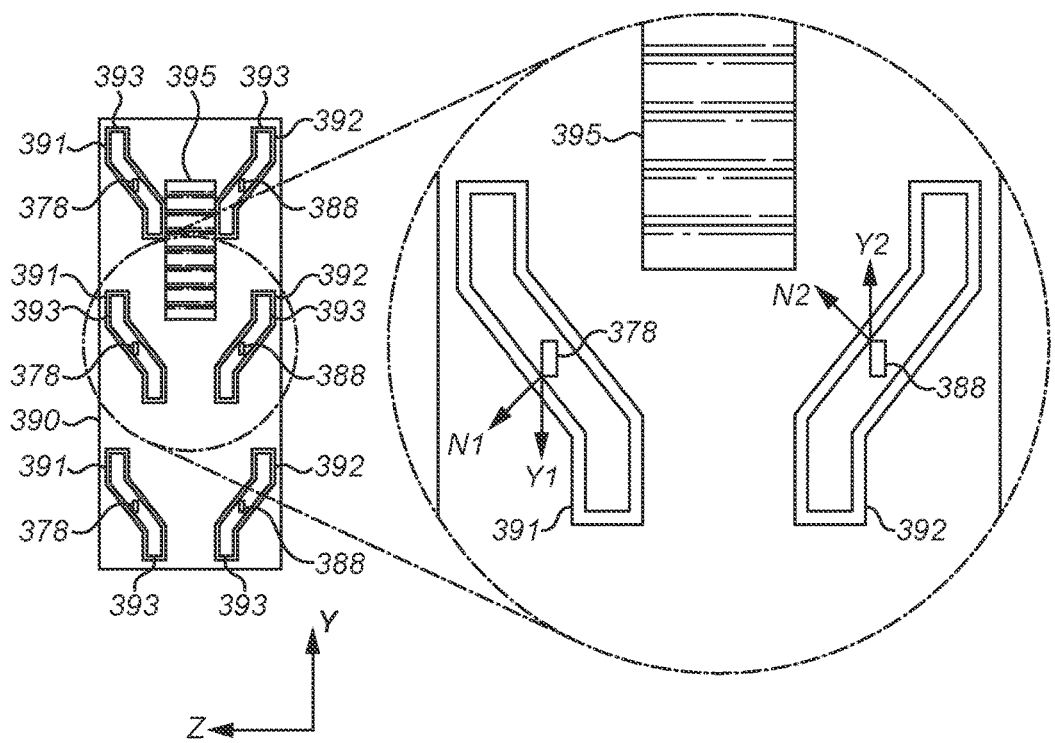
FIG. 19 is a left side elevation of the cam plate of FIG. 16 including an enlarged view of part of the cam plate showing two escalator cam tracks.

The active tabs 379, 389 of the front and rear lens assemblies 320, 330 engage in corresponding escalator tracks formed in an arcuate cam plate 390 that is mounted within the housing towards a relatively short left temple side 301 of the unit 300 (the right temple side in the right hand display unit 300). The cam plate 390 is constrained within the housing to slide along a curved path y, which is orthogonal to the optical axis z and tracks the curvature of an adjacent region of the front and rear lens assemblies 320, 330 as best seen in FIGS. 12A and 12B, between a first position as shown FIGS. 12A, 13A, 14A and 15A and a second position as shown in FIGS. 12B, 13B, 14B and 15B. The active tabs 379 of the front lens assembly 320 engage a front series of escalator tracks 391, while the active tabs 389 of the rear lens assembly 330 engage a rear series of escalator tracks 392. As best seen in FIGS. 13A, 13B and 19, the escalator tracks 391, 392 of the front and rear series are configured as mirror images of one another about a plane that is orthogonal to the optical axis z and bisects the cam plate 390 between the front and rear series of escalator tracks 391, 392 such that reciprocating movement of the cam plate along the path y causes the active tabs 379 of the front lens assembly 320 and active tabs 389 of the rear lens assembly 330 to move in opposite directions parallel to the z axis.

The number and position of the active tabs 379, 389 of the front and rear lens assemblies 320, 330 are dependent on the shape of the lens assemblies 320, 330 and the desired degree of accuracy for shaping the membranes 326, 336 into spherical optical surfaces. In the present embodiment, there are three active tabs 379, 389 for each of the front and rear lens assemblies 320, 330 at the temple side of the lens assemblies 320, 330. In other embodiments, there may be more or fewer tabs 379, 389 as required.

As best shown in FIGS. 12A and 12B, the passive tabs 378, 388 of the front and rear lens assemblies 320, 330 are disposed at spaced locations on opposite relatively long upper and lower sides 302, 303 of each support ring 377, 387 and on a relatively short nose side 304 that is positioned opposite the above-mentioned temple side 301. The passive tabs 378, 388 are coupled to the housing (not shown) of the display unit 300 to hold the support rings 377, 387 at the passive tabs 378, 388 at fixed locations relative to the housing. Each of the support rings 377, 387 is held by its passive tabs 378, 388 at a fixed distance parallel to the z axis from the front surface 324, 334 of the associated hard lens 322, 332. Since the support rings 377, 387 are bendable, they are free to bend towards or away from the hard lens 322, 332 between the passive tabs 378, 388. As described in more detail below, the passive tabs 378, 388 are located on each support ring 377, 387 at or near respective points on the support ring 377, 387 where a neutral circle NC, which is centred on the optical centre OC of the membrane 326, 336, crosses the edge of the membrane 326, 336. In the present embodiment, the passive tabs 378, 388 are therefore substantially equidistant from the optical centre. In the present embodiment, the eye-shape has been chosen to be a benign example for illustration. In particular, the temple side 304 of each support ring 377, 387 is on a radius from the optical centre OC, so that the entire temple side 304 of each support ring 377, 387 remains substantially planar at all actuation states as described below.

The rear wall 372, 382 and sidewall 373, 383 of each dish-shaped receptacle 370, 380 thus form a respective envelope having an interior cavity 325, 335 with the associated membrane 326, 336. The cavity 325, 335 of each envelope is filled with a sensibly incompressible, optically clear, refractive fluid 328, 338. The fluid 328, 338 should be colourless and have a refractive index of at least about 1.5. Suitably the refractive index of each membrane 326, 336 and the associated fluid 328, 338 should be matched, so that the interface between the membrane 326, 336 and corresponding fluid 328, 338 is substantially imperceptible to the user. The fluid 328, 338 should have low toxicity and low volatility; it should be inert and exhibit no phase change above about −10° C. or below about 100° C. The fluid 328, 338 should be stable at high temperatures of at least about 80° C. and exhibit low microbial growth. In some embodiments, the fluid 328, 338 may have a density of about 1 g/cm3. Various suitable fluids are available to those skilled in the art, including silicone oils and siloxanes such, for example, as phenylated siloxanes. A preferred fluid is pentaphenyltrimethyltrisiloxane.

In the present embodiment, each of the membranes 326, 336 is formed from a polyether polyurethane (e.g. Elastollan® 1185) and each of the fluids 328, 338 is a phenylated siloxane, e.g. pentaphenyltrimethyltrisiloxane. The refractive indexes of the membrane material and fluid are suitably the same or substantially the same and are at least 1.5.

Suitable methods for assembling the front and rear lens assemblies 320, 330, with the membranes 326, 336 under tension as aforesaid, are disclosed in WO 2017/055787 A2.

In the present embodiment, the interior cavities 325, 335 of the front and rear lens assemblies 320, 330 are filled with the refractive fluid 328, 338 such that each of the front and rear membranes 326, 336 as a minimum curvature of about 0.5 dioptres. In other embodiments, the cavities 325, 335 may be filled such that the membranes 326, 336 have other baseline curvatures. Suitable baseline curvatures are in the range about 0 to 1.0 dioptres. The baseline curvatures for the front and rear membranes 326, 336 may be the same or different from one another.

Figure 16:
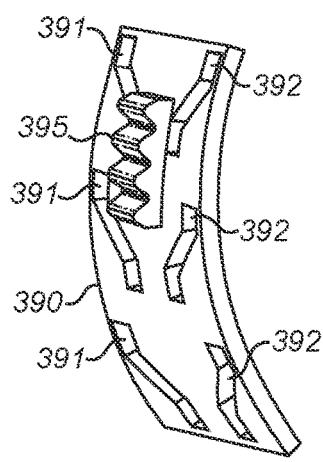
FIG. 16 is a perspective view from behind of the left side of a cam plate having an exterior rack portion, which forms part of the adjustment mechanism of the left side augmented reality display unit of FIGS. 12A, 12B, 13A, 13B, 14A, 14B, 15A and 15B.
Figure 17:
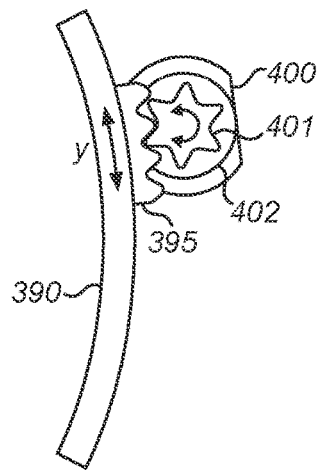
FIG. 17 is a bottom view of the cam plate of FIG. 16 and an electric motor, which also forms part of the adjustment mechanism, showing interengagement of the rack portion with a pinion that is arranged to be driven by the electric motor.
Figure 18:
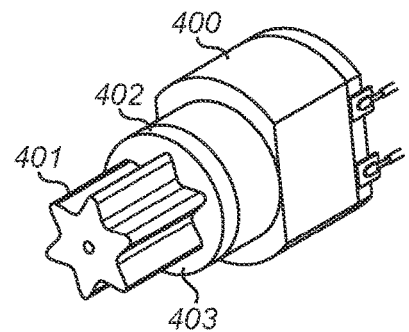
FIG. 18 is a perspective view of the electric motor shown in FIG. 17.

As described above, the cam plate 390 is operable for moving the active tabs 378, 388 on the support rings 377, 387 forwards and backwards within the housing, respectively away from and towards their corresponding hard lenses 322, 332. As best shown in FIGS. 16 and 17, an outer surface of the cam plate 390 carries a short rack 395 that engages a pinion 401 that is arranged to be driven by a bidirectional electric motor 400 through a gearbox 402. In the present embodiment, a rotational position encoder 403 is also provided to provide input signal to control electronics (not shown) relating to the position of the cam plate 390 between its first and second positions as described above. Operating the electric motor 400 thus causes movement of the rack 390 along its curved path as described above.

Figure 15A:
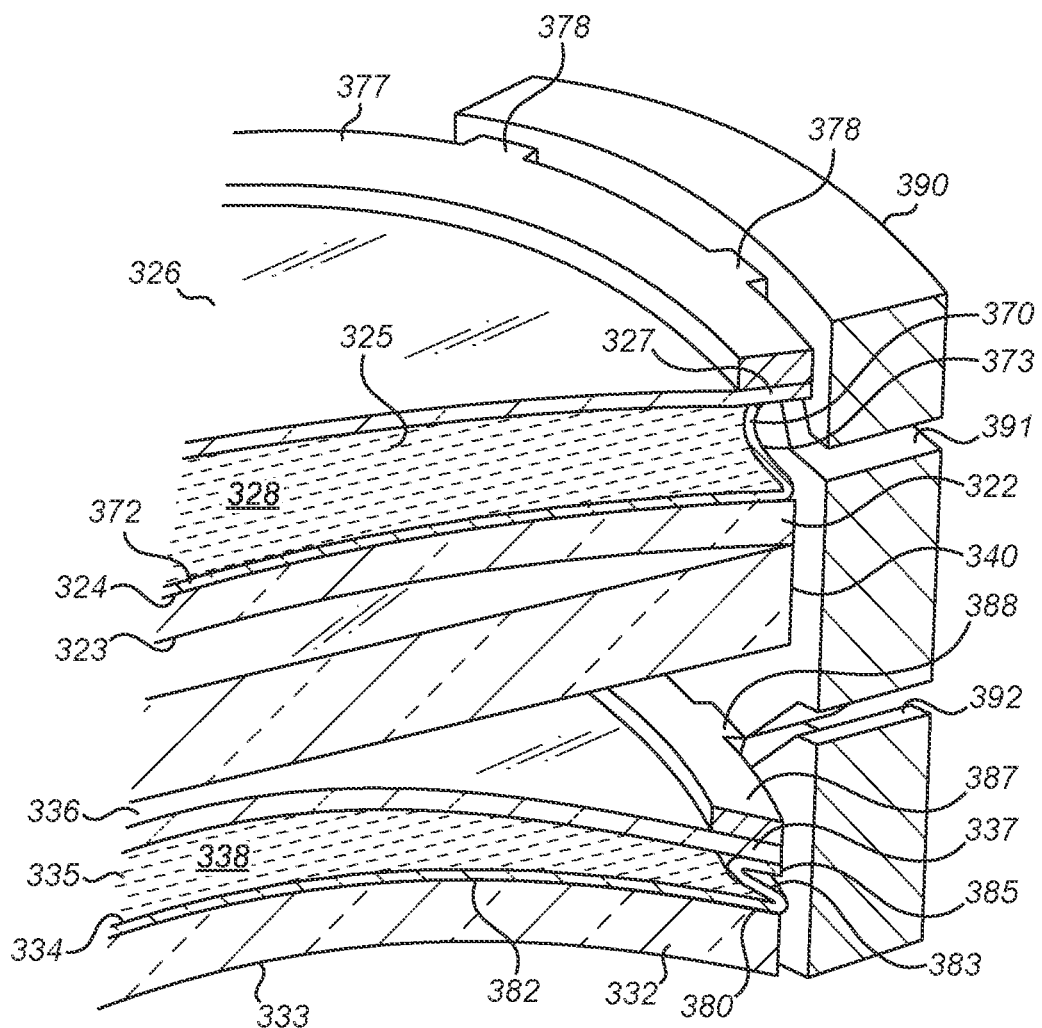
FIG. 15A is a perspective view from the front and to the right of part of the augmented reality display unit of FIGS. 12A, 12B, 13A, 13B, 14A and 14B in cross-section on the line C-C of FIG. 12A, showing the adjustment mechanism in the first position.
Figure 15B:
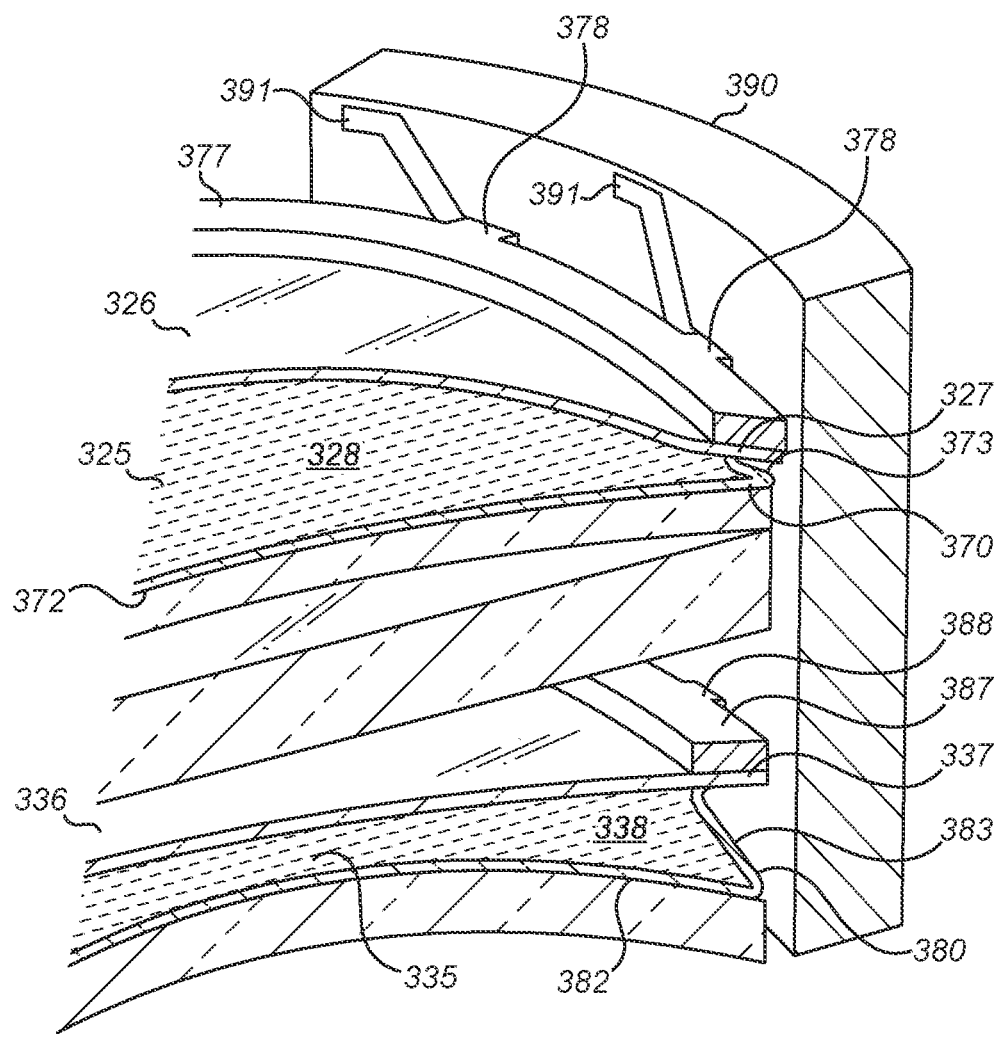
FIG. 15B is a perspective view from the front and to the right of part of the augmented reality display unit of FIGS. 12A, 12B, 13A, 13B, 14A, 14B and 15A in cross-section on the line D-D of FIG. 12B, showing the adjustment mechanism in the second position.

In the first position as illustrated in FIGS. 12A, 13A, 14A and 15A, the membrane 326 of the front lens assembly 320 is disposed in its minimally distended state with a curvature of about 0.5 dioptres as mentioned above, as best shown in FIG. 14A. The active tabs 378 on the support ring 377 of the front lens assembly 320 are disposed towards the forward ends of the front series of escalator tracks 391 as best shown in FIG. 13A. The pressure of the fluid 328 within the interior cavity 325 is in a minimal state, and the front lens assembly 320 is in a minimal potential energy condition. The net focusing power of the front lens assembly 320 is therefore about zero dioptres, since the focusing power of the membrane 326, which is about +0.5 dioptres, negates the focusing power of the rear surface 323 of the hard lens 322, which is about −0.5 dioptres.

Meanwhile, the active tabs 388 on the support ring 387 of the rear lens assembly 330 are positioned at the rear ends of the rear series of escalator tracks 392, such that the fluid-filled envelope of the rear lens assembly 330 is compressed, particularly in a region towards its temple side 301. The compressible side wall 383 of the dish-shaped receptacle 380 of the rear lens assembly 330 collapses by folding over itself, as best seen in FIG. 14A, to allow the support ring 387 to move towards the front surface 334 of the hard lens 332, particularly at the temple side 301. The pressure of the fluid 338 within the interior cavity 335 of the rear lens assembly 330 is in a maximal condition, and the membrane 336 is in a state of maximum curvature of about +2.5 dioptres. In this state, the rear lens assembly 330 is in a maximal potential energy condition. Like the front lens assembly 320, the net focusing power of the rear lens assembly 330 is also about zero dioptres, with the focusing power of the membrane 336 of +2.5 dioptres negating the focusing power of the rear surface 333 of the hard lens 332, which is about −2.5 dioptres.

With the cam plate 390 in its first position, therefore, the net focusing power of both front and rear lens assembly 320, 330 is about zero dioptres, and the combined focusing power of the entire display unit 300 is also about zero dioptres.

When the electric motor 400 is operated to drive the cam plate 390 towards its second position as shown in FIGS. 12B, 13B, 14B and 15B, the first and second series of escalator tracks 391, 392 move over the active tabs 378, 388 of the front and rear support rings 377, 387 to drive the active tabs 378 of the front lens assembly 320 rearwardly towards the corresponding hard lens 322, while causing or allowing the active tabs 388 on the rear support ring 387 to move forwardly away from the respective hard lens 332. As the cam plate 390 is thus moved progressively from its first position towards its second position, the fluid-filled envelope of the front lens assembly 320 is compressed, particularly towards its temple side 301, while the fluid-filled envelope of the rear lens assembly 330 is decompressed. Compression of the front lens assembly 320 causes the fluid pressure within the interior cavity 328 to increase, causing the membrane 326 to distend forwardly with progressively increased curvature to a maximum curvature of about +2.5 dioptres when the cam plate 390 is in the second position, as best shown in FIG. 14B. Meanwhile, decompression of the rear lens assembly 330 reduces the pressure of the fluid 338 in the cavity 335 of the rear lens assembly 330, causing or allowing the membrane 336 of the rear lens assembly 330 to relax towards its minimally distended state of +0.5 dioptres.

In this position, the active tabs 378 on the front support ring 377 are disposed at rear ends of the first series of escalators tracks 391, while the active tabs 388 on the rear support ring 387 are disposed at front ends of the second series of escalator tracks 392; the front lens assembly 320 is then in a relatively high potential energy condition, while the rear lens assembly 330 is in a relatively low potential energy condition.

The net focusing power of the front lens assembly 320 in this position is about +2 dioptres, while the net focusing power of the rear lens assembly 330 is about −2 dioptres. Accordingly, the composite focusing power of the entire display unit 300 remains about zero dioptres, but light emitted from the waveguide display 340 which passes only through the rear lens assembly 330 is subjected to the focusing power of about −2 dioptres, causing the virtual focal plane of an image carried by the light emitted from the waveguide display 340 to move towards the user as described above in relation to FIGS. 1A to 1D.

It will be appreciated that when the cam plate 390 is disposed in intermediate positions between its first and second positions, the front and rear membranes 326, 336 each have a curvature of between 0.5-2.5 dioptres. The front and rear lens assemblies 320, 330 are configured such that as each position of the cam plate 390, the combined focusing power of the front and rear membranes 326, 336 is always approximately equal to the inverse of the combined focusing power of the rear surfaces 323, 333 of the hard lenses 322, 332. In this way, the front and rear lens assemblies 320, 330 are configured to operate as a conjugate pair, so that the net focusing power of the entire display unit 300 remains approximately zero, while allowing the net focusing power of the rear lens assembly 330 which is applied to light emitted by the waveguide display 340 to vary progressively between 0 to −2 dioptres.

In the present example, therefore, the net focusing power of the display unit 300 remains approximately zero as the distance to the virtual image plane varies progressively from about 50 cm to infinity Whilst this is suitable for users with perfect vision, those skilled in the art will appreciate that a display unit with a constant, non-zero net focusing power may be required for users having refractive errors. For instance, a user with myopia may require a display unit 300 in which the rear surface 333 of the rear hard lens 332 has focussing power about −4.75 D and the rear surface 323 of the front hard lens 322 has focusing power −0.5 D, while the focusing power of each membrane 326, 336 varies between about +0.5 D and about +2.5 D as described above, such that the net composite focusing power of the display unit 300 will remain approximately −2.25 D. Other requirements, including astigmatic correction, will also be apparent to those skilled in the art. Note that any refractive error correction should be put on the rear lens assembly 330, so that the error correction is applied to both the virtual image as well as to the real world view.

As mentioned above, the front and rear membranes 326, 336 in the present embodiment should distend spherically or nearly spherically. Those skilled in the art will appreciate that as each of the front and rear lens assemblies 320, 330 is compressed in the manner described above, there will exist a "neutral circle" NC for each assembly 320, 330.

The neutral circle NC for the front lens assembly 320 is indicated in FIGS. 12A and 12B, but similar considerations also apply to the rear lens assembly 330. For a given volume of refractive fluid 328, the neutral circle NC is of constant diameter and distance from the rear wall 272 of the dish-shaped receptacle 270 that is bonded to the hard lens 322, regardless of the degree of distension of the membrane 326 and the corresponding focusing power of the lens assembly 320. The neutral circle is defined by the intersection of a plane with the membrane 326 such that the volume of fluid 328 bounded by the plane and the membrane 326 is equal above and below the plane. In other words, as the membrane 326 is distended forwardly as described above moving the cam plate 390 towards its second position, the volume of fluid 328 that is displaced from a peripheral region 351 of the cavity 325 outside the neutral circle NC, as shown in FIGS. 12A and 12B, is equal to the volume of fluid that is displaced into an inner region 352 of the cavity 325 within the neutral circle NC.

It follows that upon actuation of each of the front and rear lens assemblies 320, 330 to deform the membranes 326, 336 spherically or nearly spherically, the distance of the edge of the membrane 326, 336 from the rear wall 372, 382 of the corresponding dish-shaped receptacle 370, 380 should remain substantially constant. Accordingly, the passive tabs 379, 389 on the front and rear support ring is 377, 387 should be placed at or near locations around the support ring 377, 387 where the neutral circle NC intersects the edge of the membrane 326, 336, as mentioned above.

Figure 20:
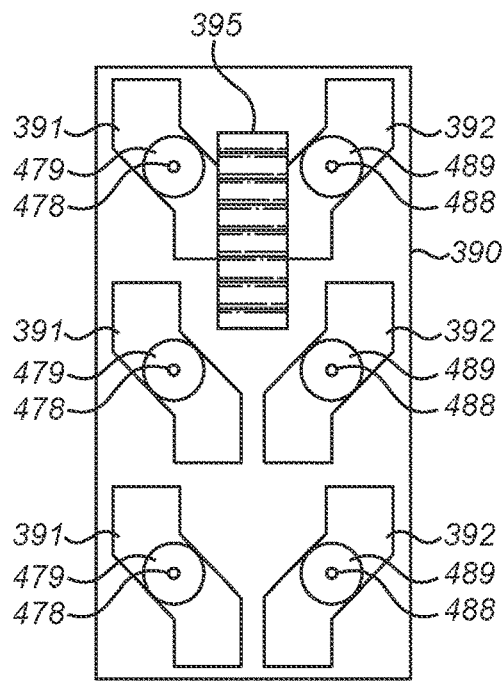
FIG. 20 is a side elevation of an alternative cam plate for use in an adjustment mechanism for an augmented reality display unit in accordance with the invention.
Figure 21:
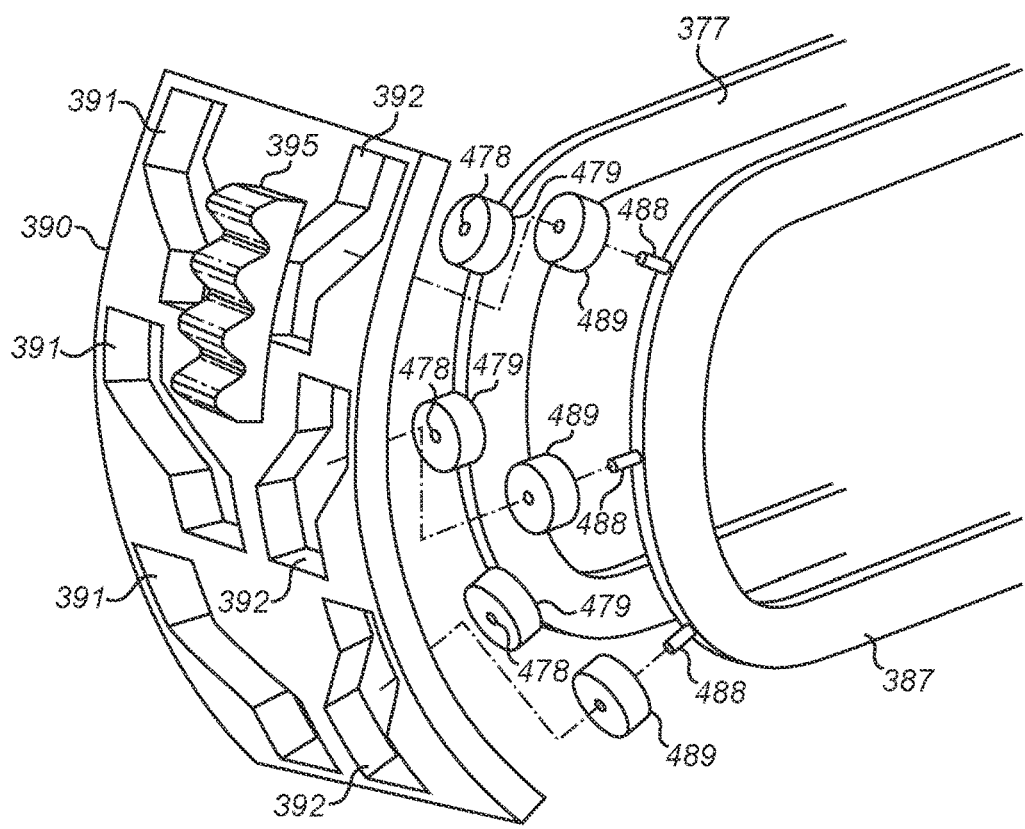
FIG. 21 is an exploded perspective view from behind of the left side of the cam plate of FIG. 20 showing its engagement with cam followers in the form of rollers on front and rear compressible liquid lens assemblies of an augmented reality display module.

Suitably, the cam plate 390 is fabricated from a strong, rigid material such, for example, as steel. As illustrated in FIG. 19, each of the escalator tracks 391, 392 is advantageously provided with liners 393 made from a low friction material such, for example, as PTFE to facilitate sliding of the active tabs 378, 388 within the escalator tracks 390, 392. Alternatively, the entire cam 390 may be coated with such a low friction material. Alternatively, or in addition, the active tabs 378, 388 may be coated with such a low friction material. In another embodiment, the active tabs 378, 388 on the front and rear support rings 377, 387 respectively may be replaced by short spindles 478, 488 that protrude outwardly from the support ring 377, 387 as shown in FIG. 21. Each short spindle 378, 488 carries a small wheel 479, 489 that is received within a respective one of the escalator tracks 391, 392 as shown in FIG. 20. The small wheels 379, 389 also serve to facilitate their movement within the escalator tracks 391, 392.

As mentioned above, when the cam plate 390 is disposed in its first position, the membrane 326 of the front lens assembly 320 is disposed in a relatively low energy state, while the membrane 336 of the rear lens assembly 330 is disposed in a relatively high energy state. As the cam plate 390 is moved, upon operation of the electric motor 400, towards its second position, the front membrane 326 becomes progressively more distended, storing more potential energy, while the rear membrane 336 progressively relaxes, releasing potential energy. It will be appreciated that by virtue of the cam plate 390, linking operation of the front and rear lens assemblies 320, 330, potential energy stored in the rear lens assembly 330 is released in the form of work in helping the electric motor 400 to drive the cam plate towards its second position in which progressively more potential energy stored in the front membrane 326.

Thus, when the cam plate 390 is disposed in its second position, the membrane 326 of the front lens assembly 320 is disposed in a relatively high energy state, while the membrane 336 of the rear lens assembly 330 is disposed in a relatively low energy state. As the cam plate 390 is moved in the opposite direction, upon operation of the electric motor 400, the front membrane 326 relaxes, releasing potential energy, while the rear membrane 336 becomes progressively more distended, storing potential energy, and energy is released from the front lens assembly 320 in the form of work for assisting the electric motor 400 to drive the cam plate 390 back towards its first position in which more potential energy stored in the rear membrane 336.

To a first order, a quasi-static actuation of the front and rear lens assemblies 320, 330, in the absence of friction, requires half the work required to actuate either of the front or rear lens assemblies 320, 330 individually. The use of low friction materials on the active tabs 378, 388 or spindle-wheel assemblies 478, 479; 488, 489 can be used to reduce friction in the escalator tracks of the cam plate 390 to allow as much energy as possible released from one of the lens assemblies 320, 330 as it relaxes to be expended as work in accordance with the present invention to facilitate actuation of the other lens assembly 330, 320 as it distends.

FIG. 19 shows the cam plate 390 in an intermediate position between the first and second positions. As shown, the active tabs 378, 388 10 to push forwardly on the cam plate 319 the actuator tracks in a direction parallel to the z-axis. N1 and N2 show the normal force on the cam plate 390 by the active tabs 378, 388 respectively, while arrows Y1 and Y2 are the resultant forces in they direction by the active tabs 378, 388. It will be appreciated that in either direction of movement of the cam plate 390, the active tabs 378, 388 in one of the first or second series of escalator tracks 391, 392 will assist with movement of the cam plate 390, while the active tabs 388, 378 in the other of the second or first series of escalator tracks 392, 391 will resist such movement, so long as friction between the active tabs 378, 388 and the escalator tracks 391, 392 small. In the absence of friction, the single cam plate 390 for actuating both front and rear lens assemblies 320, 330 requires less work than an equivalent single cam for positive actuation of a single lens. For the cam plate 390 moving from the first position to the second position, example, elastic potential energy in de-actuating the rear lens assembly 330 helps actuating the front lens assembly 320.

The invention claimed is:

1. An augmented reality display unit comprising front and rear variable focusing power compression liquid lens assemblies in mutual optical alignment on an optical axis, a transparent waveguide display interposed between the front and rear liquid lens assemblies and a selectively operable adjustment mechanism for adjusting the focusing powers of the front and rear compression liquid lens assemblies; wherein each of the front and rear compression liquid lens assemblies comprises a fluid-filled envelope having a first wall formed by a distensible elastic membrane that is held under tension around its edge by a membrane holding structure, a second substantially rigid wall formed by or supported on an inner surface of a transparent plate or a hard lens of fixed focusing power, and a collapsible side wall, the membrane forming an optical surface of variable optical power, and the adjustment mechanism being arranged to displace the membrane holding structure towards or away from the second wall parallel to the optical axis for increasing or decreasing the pressure of the fluid within the envelope thereby to cause the membrane to distend or contract respectively parallel to the optical axis for changing the focusing power of the optical surface of the membrane;

wherein the second wall of the front compression liquid lens is formed by or supported on the transparent plate or hard lens of the front compression liquid lens which is tilted at a first angle to the optical axis to introduce a first amount of prism to a ray of light passing therethrough, and the second wall of the rear compression liquid lens is formed by or supported on the transparent plate or hard lens of the rear compression liquid lens which is tilted at a second angle to the optical axis to introduce a second amount of prism to a ray of light passing therethrough, wherein the first and second amounts of prism are mutually substantially equal and opposite.

2. The augmented reality display unit as claimed in claim 1, wherein the transparent waveguide display is configured to output light therefrom with an amount of prism that is equal to the first amount of prism.

3. The augmented reality display unit as claimed in claim 1, wherein the front compression liquid lens assembly is configured such that its membrane in its least distended form has a curvature away from the second wall of the front compression liquid lens assembly that is greater than the curvature of the second wall of the front compression liquid lens assembly, the second wall of the rear compression liquid lens assembly is formed by or supported on an inner surface of a hard lens of fixed focusing power, and the rear compression liquid lens assembly is configured such that the membrane of the rear compression liquid lens assembly in its least distended form has a curvature away from the second wall of the rear compression liquid lens assembly that is less than the curvature of the second wall of the rear compression liquid lens assembly; and wherein the transparent plate or hard lens of the front compression liquid lens assembly is tilted towards a first region of the edge of the membrane of the front compression liquid lens assembly, the hard lens of the rear compression liquid lens assembly is tilted away from a second region of the edge of the membrane of the rear compression liquid lens assembly, the first and second regions of the edges of the membranes of the respective front and rear compression liquid lens assemblies being mutually aligned, and the optical axis is located in an off-centre position towards the aligned first and second regions of the respective front and rear compression liquid lens assemblies.

4. The augmented reality display unit as claimed in claim 1; wherein the selectively operable adjustment mechanism is configured for simultaneously adjusting the focusing powers of the front and rear compression liquid lens assemblies in a mutually inverse manner; each of the front and rear compression liquid lens assemblies stores elastic potential energy as its absolute focusing power is increased and releases elastic potential energy as its absolute focusing power is decreased; and the adjustment mechanism is configured to couple the front and rear compression liquid lens assemblies together such that elastic potential energy released by one of the compression liquid lens assemblies as its absolute focusing power is decreased assists in driving the adjustment mechanism to increase the absolute focusing power of the other compression liquid lens assembly.

5. The augmented reality display unit as claimed in claim 1, wherein the membrane holding structure comprises a peripheral support ring.

6. The augmented reality display unit as claimed in claim 5, wherein the peripheral support ring is resiliently bendable.

7. The augmented reality display unit as claimed in claim 6, wherein the adjustment mechanism is arranged to displace one or more regions of the peripheral support ring towards or away from the second wall parallel to the optical axis, causing bending of the peripheral support ring.

8. The augmented reality display unit as claimed in claim 1, wherein the adjustment mechanism engages the membrane holding structure at one or more actuation points such that operation of the adjustment mechanism causes local displacement of the edge of the membrane towards or away from the second wall parallel to the optical axis at the one or more actuation points.

9. The augmented reality display unit as claimed in claim 1, wherein the adjustment mechanism comprises a reciprocally moveable structural member that is operably connected to the membrane holding structures of the front and rear compression liquid lens assemblies for simultaneously displacing the membrane holding structures towards or away from their respective second walls parallel to the optical axis in a mutually inverse manner, such that when the absolute focusing power of one of the compression liquid lens assemblies is increased, the absolute focusing power of the other compression liquid lens assembly is decreased and vice versa.

10. The augmented reality display unit as claimed in claim 1, wherein the second wall of the front compression liquid lens is formed by or supported on a hard lens having an optical outer surface having a focusing power in the range of about −1.0 to about 0 dioptres.

11. The augmented reality display unit as claimed in claim 10, wherein the optical surface of the membrane of the front compression liquid lens has a baseline focusing power of about 0 to 1.0 dioptres, and is adjustable by an amount in the range of about 1.0 to 3.0 dioptres.

12. The augmented reality display unit as claimed in claim 1, wherein the second wall of the rear compression liquid lens is formed by or supported on a hard lens having an optical outer surface having a focusing power in the range of about −1.0 to about −3.0 dioptres.

13. TheAn augmented reality display unit as claimed in claim 12, wherein the optical surface of the membrane of the rear compression liquid lens has a baseline focusing power of about 0 to 1.0 dioptres, and is adjustable by an amount in the range of about 1.0 to 3.0 dioptres.

14. The augmented reality display unit as claimed in claim 1, wherein a net focusing power of the augmented display unit remains substantially zero during adjustment of the front and rear compression liquid lens assemblies.

15. The augmented reality display unit as claimed in claim 1, wherein a net focusing power of the augmented display unit remains non-zero and substantially constant during adjustment of the front and rear compression liquid lens assemblies such as to correct a user's refractive error.

16. An augmented reality headset for a user, which comprises at least one augmented reality display unit as claimed in claim 1 and at least one projector, wherein the augmented reality display unit is arranged to be positioned in front of the user's eye when the headset is worn and the projector has an output coupled to the transparent waveguide display.

17. The augmented reality headset as claimed in claim 16, which comprises two augmented reality display units, wherein each of the augmented reality display units is arranged to be positioned in front of a respective one of the user's eyes when the headset is worn.

18. An augmented reality display unit comprising front and rear variable focusing power compression liquid lens assemblies in mutual optical alignment on an optical axis, a transparent waveguide display interposed between the front and rear liquid lens assemblies and a selectively operable adjustment mechanism for simultaneously adjusting the focusing powers of the front and rear compression liquid lens assemblies in a mutually inverse manner; wherein each of the front and rear compression liquid lens assemblies is configured to store elastic potential energy when its absolute focusing power is increased and to release elastic potential energy when its absolute focusing power is decreased; and wherein the adjustment mechanism couples the front and rear compression liquid lens assemblies together such that elastic potential energy released by one of the compression liquid lens assemblies when its absolute focusing power is decreased drives the adjustment mechanism to increase the absolute focusing power of the other compression liquid lens assembly.

19. The augmented reality display unit as claimed in claim 18, wherein each of the front and rear compression liquid lens assemblies comprises a fluid-filled envelope having a first wall formed by a distensible elastic membrane that is held under tension around its edge by a membrane holding structure, a second substantially rigid wall formed by or supported on an inner surface of a transparent plate or a hard lens of fixed focusing power, and a collapsible side wall; wherein the membrane forms an optical surface of variable optical power, and the adjustment mechanism is arranged to displace the membrane holding structure towards or away from the second wall parallel to the optical axis for increasing or decreasing the pressure of the fluid within the envelope thereby to cause the membrane to distend or contract respectively parallel to the optical axis for changing the focusing power of the optical surface of the membrane.

20. The augmented reality display unit as claimed in claim 19, wherein the membrane holding structure comprises a peripheral support ring.

21. The augmented reality display unit as claimed in claim 20, wherein the peripheral support ring is resiliently bendable.

22. The augmented reality display unit as claimed in claim 21, wherein the adjustment mechanism is arranged to displace one or more regions of the peripheral support ring towards or away from the second wall parallel to the optical axis, thereby bending of the peripheral support ring.

23. The augmented reality display unit as claimed in claim 20, wherein the adjustment mechanism engages the membrane holding structure at one or more actuation points such that operation of the adjustment mechanism causes local displacement of the edge of the membrane towards or away from the second wall parallel to the optical axis at the one or more actuation points.

24. The augmented reality display unit as claimed in claim 10, wherein the adjustment mechanism comprises a reciprocally moveable structural member that is operably connected to the membrane holding structures of the front and rear compression liquid lens assemblies for simultaneously displacing the membrane holding structures towards or away from their respective second walls parallel to the optical axis in a mutually inverse manner, such that when the absolute focusing power of one of the compression liquid lens assemblies is increased, the absolute focusing power of the other compression liquid lens assembly is decreased and vice versa.

25. The augmented reality display unit as claimed in claim 24, wherein the adjustment mechanism comprises a reciprocally moveable cam plate having one or more first cam surfaces arranged to engage one or more respective cam follower members at one or more of the actuation points on the membrane holding structure of the front compression liquid lens assembly, and one or more second cam surfaces arranged to engage one or more respective cam follower members at one or more of the actuation points on the membrane holding structure of the rear compression liquid lens assembly; the one or more first cam surfaces and one or more second cam surfaces being configured such that movement of the cam plate causes simultaneous displacement of the membrane holding structures of the front and rear compression liquid lens assemblies at their respective actuation points towards or away from their respective second walls parallel to the optical axis in a mutually inverse manner, such that as the absolute focusing power of one of the compression liquid lens assemblies is increased the absolute focusing power of the other compression liquid lens assembly is decreased and vice versa.

26. The augmented reality display unit as claimed in claim 25, wherein the reciprocally moveable structural member comprises a collar having first and second opposite ends that is disposed around the waveguide display and arranged for reciprocal movement parallel to the optical axis between the front and rear liquid compression lens assemblies, the first end of the collar or at least one part connected thereto being arranged to engage the membrane holding structure of the front compression liquid lens assembly, and the second end of the collar or at least one part connected thereto being arranged to engage the membrane holding structure of the rear compression liquid lens assembly.

27. The augmented reality display unit as claimed in claim 26, wherein the front and rear compression liquid lens assemblies are arranged with their respective membranes and membrane holding structures facing towards the collar.

28. The augmented reality display unit as claimed in claim 26, wherein the collar is formed with at least one aperture which remains aligned with the waveguide display at all positions of the collar between the front and rear compression liquid lens assemblies.

* * * * *